United States Patent
Tan et al.

(10) Patent No.: US 9,652,090 B2
(45) Date of Patent: May 16, 2017

(54) DEVICE FOR DIGITAL COMMUNICATION THROUGH CAPACITIVE COUPLING

(75) Inventors: Liquan Tan, Sunnyvale, CA (US); Jonah A. Harley, Los Gatos, CA (US); Feiqiao Brian Yu, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,963

(22) Filed: Jul. 27, 2012

(65) Prior Publication Data

US 2014/0028607 A1    Jan. 30, 2014

(51) Int. Cl.
  G06F 3/045 (2006.01)
  G06F 3/044 (2006.01)
  G06F 3/041 (2006.01)
  G06F 3/0354 (2013.01)

(52) U.S. Cl.
  CPC .......... *G06F 3/044* (2013.01); *G06F 3/03545* (2013.01); *G06F 3/045* (2013.01); *G06F 3/0416* (2013.01)

(58) Field of Classification Search
  None
  See application file for complete search history.

(56) References Cited

U.S. PATENT DOCUMENTS

| | | |
|---|---|---|
| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |

(Continued)

FOREIGN PATENT DOCUMENTS

| | | |
|---|---|---|
| CN | 1243282 A | 2/2000 |
| CN | 1278348 A | 12/2000 |

(Continued)

OTHER PUBLICATIONS

Abileah, A. et al. (2004). "59.3: Integrated Optical Touch Panel in a 14.1' AMLCD," *SID '04 Digest* (Seattle) pp. 1544-1547.

(Continued)

*Primary Examiner* — Jennifer Mehmood
*Assistant Examiner* — Stephen T Reed
(74) *Attorney, Agent, or Firm* — Morrison & Foerster LLP

(57) ABSTRACT

A computing device configured to communicate with an input device. The computing device includes a processor, a touch interface, such as a touch screen, and a receiving unit. The touch interface is configured to detect an input signal corresponding to an object approaching or contacting a surface. The receiving unit is configured to receive, through the touch interface, at least one input signal from the input device, and the receiving unit amplifies the at least one input signal creating at least one amplified input signal. Additionally, at least one of the processor or the receiving unit analyzes the at least one amplified input signal and creates at least one output digital signal corresponding to the at least one input signal.

23 Claims, 11 Drawing Sheets

(56) References Cited

U.S. PATENT DOCUMENTS

| | | | |
|---|---|---|---|
| 4,481,510 | A | 11/1984 | Hareng et al. |
| 4,484,179 | A | 11/1984 | Kasday |
| 4,490,607 | A | 12/1984 | Pease et al. |
| 4,496,981 | A | 1/1985 | Ota |
| 4,520,357 | A | 5/1985 | Castleberry et al. |
| 4,542,375 | A | 9/1985 | Alles et al. |
| 4,602,321 | A | 7/1986 | Bornhorst |
| 4,603,356 | A | 7/1986 | Bates |
| 4,642,459 | A | 2/1987 | Caswell et al. |
| 4,644,338 | A | 2/1987 | Aoki et al. |
| 4,655,552 | A | 4/1987 | Togashi et al. |
| 4,662,718 | A | 5/1987 | Masubuchi |
| 4,671,671 | A | 6/1987 | Suetaka |
| 4,677,428 | A | 6/1987 | Bartholow |
| 4,679,909 | A | 7/1987 | Hamada et al. |
| 4,684,939 | A | 8/1987 | Streit |
| 4,698,460 | A | 10/1987 | Krein et al. |
| 4,705,942 | A | 11/1987 | Budrikis et al. |
| 4,720,869 | A | 1/1988 | Wadia |
| 4,736,203 | A | 4/1988 | Sidlauskas |
| 4,740,782 | A | 4/1988 | Aoki et al. |
| 4,749,879 | A | 6/1988 | Peterson et al. |
| 4,759,610 | A | 7/1988 | Yanagisawa |
| 4,767,192 | A | 8/1988 | Chang et al. |
| 4,772,101 | A | 9/1988 | Liu |
| 4,782,327 | A | 11/1988 | Kley et al. |
| 4,782,328 | A | 11/1988 | Denlinger |
| 4,785,564 | A | 11/1988 | Gurtler |
| 4,794,634 | A | 12/1988 | Torihata et al. |
| 4,814,760 | A | 3/1989 | Johnston et al. |
| 4,823,178 | A | 4/1989 | Suda |
| 4,838,655 | A | 6/1989 | Hunahata et al. |
| 4,846,559 | A | 7/1989 | Kniffler |
| 4,877,697 | A | 10/1989 | Vollmann et al. |
| 4,893,120 | A | 1/1990 | Doering et al. |
| 4,904,056 | A | 2/1990 | Castleberry |
| 4,917,474 | A | 4/1990 | Yamazaki et al. |
| 4,940,901 | A | 7/1990 | Henry et al. |
| 5,003,356 | A | 3/1991 | Wakai et al. |
| 5,037,119 | A | 8/1991 | Takehara et al. |
| 5,039,206 | A | 8/1991 | Wiltshire |
| 5,051,570 | A | 9/1991 | Tsujikawa et al. |
| 5,063,379 | A | 11/1991 | Fabry et al. |
| 5,083,175 | A | 1/1992 | Hack et al. |
| 5,105,186 | A | 4/1992 | May |
| 5,113,041 | A | 5/1992 | Blonder et al. |
| 5,117,071 | A | 5/1992 | Greanias et al. |
| 5,140,153 | A | 8/1992 | Heikkinen et al. |
| 5,151,688 | A | 9/1992 | Tanaka et al. |
| 5,153,420 | A | 10/1992 | Hack et al. |
| 5,172,104 | A | 12/1992 | Tanigaki et al. |
| 5,182,661 | A | 1/1993 | Ikeda et al. |
| 5,204,661 | A | 4/1993 | Hack et al. |
| 5,236,850 | A | 8/1993 | Zhang |
| 5,237,314 | A | 8/1993 | Knapp |
| 5,239,152 | A | 8/1993 | Caldwell et al. |
| 5,243,332 | A | 9/1993 | Jacobson |
| 5,276,538 | A | 1/1994 | Monji et al. |
| 5,301,048 | A | 4/1994 | Huisman |
| 5,308,964 | A | 5/1994 | Kwon |
| 5,339,090 | A | 8/1994 | Crossland et al. |
| 5,339,091 | A | 8/1994 | Yamazaki et al. |
| 5,341,133 | A | 8/1994 | Savoy et al. |
| 5,349,174 | A | 9/1994 | Van Berkel et al. |
| 5,360,426 | A | 11/1994 | Muller et al. |
| 5,365,461 | A * | 11/1994 | Stein et al. .................. 700/298 |
| 5,369,262 | A | 11/1994 | Dvorkis et al. |
| 5,376,948 | A | 12/1994 | Roberts |
| 5,381,251 | A | 1/1995 | Nonomura et al. |
| 5,386,543 | A | 1/1995 | Bird |
| 5,387,445 | A | 2/1995 | Horiuchi et al. |
| 5,414,283 | A | 5/1995 | den Boer et al. |
| 5,422,693 | A | 6/1995 | Vogeley et al. |
| 5,430,462 | A | 7/1995 | Katagiri et al. |
| 5,445,871 | A | 8/1995 | Murase et al. |
| 5,446,564 | A | 8/1995 | Mawatari et al. |
| 5,461,400 | A | 10/1995 | Ishii et al. |
| 5,475,398 | A | 12/1995 | Yamazaki et al. |
| 5,483,261 | A | 1/1996 | Yasutake |
| 5,483,263 | A | 1/1996 | Bird et al. |
| 5,485,177 | A | 1/1996 | Shannon et al. |
| 5,488,204 | A | 1/1996 | Mead et al. |
| 5,502,514 | A | 3/1996 | Vogeley et al. |
| 5,510,916 | A | 4/1996 | Takahashi |
| 5,515,186 | A | 5/1996 | Fergason et al. |
| 5,525,813 | A | 6/1996 | Miyake et al. |
| 5,532,743 | A | 7/1996 | Komobuchi |
| 5,559,471 | A | 9/1996 | Black |
| 5,568,292 | A | 10/1996 | Kim |
| 5,581,378 | A | 12/1996 | Kulick et al. |
| 5,585,817 | A | 12/1996 | Itoh et al. |
| 5,589,961 | A | 12/1996 | Shigeta et al. |
| 5,598,004 | A | 1/1997 | Powell et al. |
| 5,608,390 | A * | 3/1997 | Gasparik .................. 340/870.01 |
| 5,610,629 | A | 3/1997 | Baur |
| 5,635,982 | A | 6/1997 | Zhang et al. |
| 5,637,187 | A | 6/1997 | Takasu et al. |
| 5,652,600 | A | 7/1997 | Khormaei et al. |
| 5,659,332 | A | 8/1997 | Ishii et al. |
| 5,677,744 | A | 10/1997 | Yoneda et al. |
| 5,709,118 | A | 1/1998 | Ohkubo |
| 5,712,528 | A | 1/1998 | Barrow et al. |
| 5,734,491 | A | 3/1998 | Debesis |
| 5,736,980 | A | 4/1998 | Iguchi et al. |
| 5,751,453 | A | 5/1998 | Baur |
| 5,757,522 | A | 5/1998 | Kulick et al. |
| 5,767,623 | A | 6/1998 | Friedman et al. |
| 5,777,713 | A | 7/1998 | Kimura |
| 5,778,108 | A | 7/1998 | Coleman, Jr. |
| 5,790,106 | A | 8/1998 | Hirano et al. |
| 5,793,342 | A | 8/1998 | Rhoads |
| 5,796,121 | A | 8/1998 | Gates |
| 5,796,473 | A | 8/1998 | Murata et al. |
| 5,812,109 | A | 9/1998 | Kaifu et al. |
| 5,818,037 | A | 10/1998 | Redford et al. |
| 5,818,553 | A | 10/1998 | Koenck et al. |
| 5,818,956 | A | 10/1998 | Tuli |
| 5,825,352 | A | 10/1998 | Bisset et al. |
| 5,831,693 | A | 11/1998 | McCartney, Jr. et al. |
| 5,834,765 | A | 11/1998 | Ashdown |
| 5,835,079 | A | 11/1998 | Shieh |
| 5,838,290 | A | 11/1998 | Kuijk |
| 5,838,308 | A | 11/1998 | Knapp et al. |
| 5,852,487 | A | 12/1998 | Fujimori et al. |
| 5,854,448 | A | 12/1998 | Nozaki et al. |
| 5,854,881 | A | 12/1998 | Yoshida et al. |
| 5,877,735 | A | 3/1999 | King et al. |
| 5,880,411 | A | 3/1999 | Gillespie et al. |
| 5,883,715 | A | 3/1999 | Steinlechner et al. |
| 5,890,799 | A | 4/1999 | Yiu et al. |
| 5,917,464 | A | 6/1999 | Stearns |
| 5,920,309 | A * | 7/1999 | Bisset et al. .................. 345/173 |
| 5,920,360 | A | 7/1999 | Coleman, Jr. |
| 5,923,320 | A | 7/1999 | Murakami et al. |
| 5,926,238 | A | 7/1999 | Inoue et al. |
| 5,930,591 | A | 7/1999 | Huang |
| 5,940,049 | A | 8/1999 | Hinman et al. |
| 5,942,761 | A | 8/1999 | Tuli |
| 5,956,020 | A * | 9/1999 | D'Amico et al. ............ 345/173 |
| 5,959,617 | A | 9/1999 | Bird et al. |
| 5,959,697 | A | 9/1999 | Coleman, Jr. |
| 5,962,856 | A | 10/1999 | Zhao et al. |
| 5,966,108 | A | 10/1999 | Ditzik |
| 5,973,312 | A | 10/1999 | Curling et al. |
| 5,990,980 | A | 11/1999 | Golin |
| 5,990,988 | A | 11/1999 | Hanihara et al. |
| 5,995,172 | A | 11/1999 | Ikeda et al. |
| 6,002,387 | A * | 12/1999 | Ronkka et al. ................ 345/157 |
| 6,020,590 | A | 2/2000 | Aggas et al. |
| 6,020,945 | A | 2/2000 | Sawai et al. |
| 6,023,307 | A | 2/2000 | Park |
| 6,028,581 | A | 2/2000 | Umeya |
| 6,049,428 | A | 4/2000 | Khan et al. |
| 6,061,177 | A | 5/2000 | Fujimoto |

(56) References Cited

U.S. PATENT DOCUMENTS

| | | |
|---|---|---|
| 6,064,374 A | 5/2000 | Fukuzaki |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,754,472 B1 | 6/2004 | Williams et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 * | 11/2007 | Morag et al. ............... 345/173 |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 * | 1/2011 | Palay et al. ............... 345/173 |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |

(56) References Cited

U.S. PATENT DOCUMENTS

| | | |
|---|---|---|
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 | 4/2014 | Coulson et al. |
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 | 1/2015 | Harley et al. |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,310,923 B2 | 4/2016 | Krah et al. |
| 9,329,703 B2 | 5/2016 | Falkenburg et al. |
| 9,519,361 B2 | 12/2016 | Harley et al. |
| 9,557,845 B2 | 1/2017 | Shahparnia |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0081205 A1 | 4/2004 | Coulson |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0159478 A1 | 7/2006 | Kikuchi |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0217064 A1 | 9/2006 | Glass et al. |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1 | 6/2007 | Errico et al. |
| 2007/0216905 A1 | 9/2007 | Han et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | de Boer et al. |
| 2008/0142280 A1 | 6/2008 | Yamamoto et al. |
| 2008/0158165 A1 | 7/2008 | Geaghan et al. |
| 2008/0158167 A1 | 7/2008 | Hotelling et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0242346 A1 | 10/2008 | Rofougaran et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |

(56) References Cited

U.S. PATENT DOCUMENTS

| | | |
|---|---|---|
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0140986 A1 | 6/2009 | Karkkainen et al. |
| 2009/0153152 A1 | 6/2009 | Maharyta et al. |
| 2009/0153525 A1 | 6/2009 | Chang |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1* | 1/2010 | Elias ............... 178/18.06 |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu et al. |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1* | 4/2010 | King-Smith et al. ......... 345/174 |
| 2010/0118237 A1 | 5/2010 | Katoh et al. |
| 2010/0155153 A1 | 6/2010 | Zachut |
| 2010/0160041 A1 | 6/2010 | Grant et al. |
| 2010/0194692 A1* | 8/2010 | Orr et al. ............... 345/173 |
| 2010/0252335 A1* | 10/2010 | Orsley ............... 178/18.03 |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1* | 12/2010 | Hargreaves et al. ......... 345/179 |
| 2010/0315394 A1 | 12/2010 | Katoh et al. |
| 2010/0321320 A1 | 12/2010 | Hung et al. |
| 2010/0327882 A1* | 12/2010 | Shahparnia et al. ......... 324/659 |
| 2010/0328249 A1* | 12/2010 | Ningrat ............... G06F 3/046 345/174 |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1* | 4/2011 | Marino et al. ............... 341/5 |
| 2011/0084937 A1 | 4/2011 | Chang et al. |
| 2011/0090146 A1* | 4/2011 | Katsurahira ............... 345/156 |
| 2011/0090181 A1 | 4/2011 | Maridakis |
| 2011/0118030 A1 | 5/2011 | Walley et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304583 A1 | 12/2011 | Kruglick |
| 2011/0304592 A1 | 12/2011 | Booth et al. |
| 2012/0013555 A1* | 1/2012 | Maeda et al. ............... 345/173 |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1* | 3/2012 | Miller et al. ............... 345/174 |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1* | 5/2012 | Kremin et al. ............... 345/174 |
| 2012/0139865 A1 | 6/2012 | Krah |
| 2012/0146958 A1 | 6/2012 | Oda et al. |
| 2012/0154295 A1* | 6/2012 | Hinckley et al. ............... 345/173 |
| 2012/0154340 A1 | 6/2012 | Vuppu et al. |
| 2012/0182259 A1 | 7/2012 | Han |
| 2012/0212421 A1* | 8/2012 | Honji ............... 345/173 |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1* | 12/2012 | Takatsuka ............... 345/179 |
| 2012/0327040 A1 | 12/2012 | Simon |
| 2012/0327041 A1 | 12/2012 | Harley |
| 2012/0331546 A1 | 12/2012 | Falkenburg |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1* | 5/2013 | Shahparnia et al. ............... 345/173 |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1* | 10/2013 | Zeliff et al. ............... 345/174 |
| 2014/0028576 A1 | 1/2014 | Shahparnia |
| 2014/0028577 A1 | 1/2014 | Krah |
| 2014/0028607 A1 | 1/2014 | Tan |
| 2014/0077827 A1 | 3/2014 | Seguine |
| 2014/0132556 A1 | 5/2014 | Huang et al. |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0267075 A1 | 9/2014 | Shahparnia et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |
| 2015/0338950 A1 | 11/2015 | Ningrat et al. |
| 2016/0162011 A1 | 6/2016 | Verma |
| 2016/0162101 A1 | 6/2016 | Pant et al. |
| 2016/0162102 A1 | 6/2016 | Shahparnia et al. |
| 2016/0179281 A1 | 6/2016 | Krah et al. |
| 2016/0357343 A1 | 12/2016 | Falkenburg et al. |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| CN | 201837984 U | 5/2011 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |

(56) References Cited

FOREIGN PATENT DOCUMENTS

| | | |
|---|---|---|
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 1 884 863 A1 | 2/2008 |
| EP | 2 040 149 A2 | 3/2009 |
| EP | 2 172 834 A2 | 4/2010 |
| EP | 2 221 659 A1 | 8/2010 |
| EP | 2 660 689 A1 | 11/2013 |
| JP | 55-074635 | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 05-243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| JP | 2009-054141 A | 3/2009 |
| KR | 10-2013-0109207 | 10/2013 |
| TW | 200743986 A | 12/2007 |
| TW | 200925944 A | 6/2009 |
| TW | 201115414 A | 5/2011 |
| TW | 201118682 A1 | 6/2011 |
| TW | 201324242 A1 | 6/2013 |
| TW | 201419103 A | 5/2014 |
| TW | 201504874 A | 2/2015 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2009/105115 A2 | 8/2009 |
| WO | WO-2011/008533 A2 | 1/2011 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569 A2 | 3/2013 |
| WO | WO-2012/177569 A3 | 3/2013 |
| WO | WO-2014/018233 A1 | 1/2014 |
| WO | WO-2014/143430 A1 | 9/2014 |
| WO | WO-2015/017196 A1 | 2/2015 |

OTHER PUBLICATIONS

Abileah, A. et al. (2006). "9.3: Optical Sensors Embedded within AMLCD Panel: Design and Applications," *ADEAC '06, SID* (Atlanta) pp. 102-105.

Abileah, A. et al. (2007). "Optical Sensors Embedded within AMLCD Panel: Design and Applications," *Siggraph-07*, San Diego, 5 pages.

Anonymous. (2002). "Biometric Smart Pen Project," located at http://www.biometricsmartpen.de/. . . , last visited Apr. 19, 2011, one page.

Bobrov, Y. et al. (2002). "5.2 Manufacturing of a Thin-Film LCD," *Optiva, Inc.*, San Francisco, CA. 4 pages.

Brown, C. et al. (2007). "7.2: A 2.6 inch VGA LCD with Optical Input Function using a 1-Transistor Active-Pixel Sensor," *ISSCC 2007* pp. 132-133, 592.

Den Boer, W. et al. (2003). "56.3: Active Matrix LCD with Integrated Optical Touch Screen," *SID'03 Digest* (Baltimore) pp. 1-4.

Echtler, F. et al. (Jan. 2010). "An LED-based Multitouch Sensor for LCD Screens," Cambridge, MA *ACM* 4 pages.

Final Office Action mailed Mar. 4, 2004, for U.S. Appl. No. 10/217,798, filed Aug. 12, 2002, 17 pages.

Final Office Action mailed Jan. 21, 2005, for U.S. Appl. No. 10/329,217, filed Dec. 23, 2002, 13 pages.

Final Office Action mailed Aug. 9, 2005, for U.S. Appl. No. 10/442,433, filed May 20, 2003, six pages.

Final Office Action mailed Aug. 23, 2005, for U.S. Appl. No. 10/217,798, filed Aug. 12, 2002, 10 pages.

Final Office Action mailed Dec. 13, 2005, for U.S. Appl. No. 10/371,413, filed Feb. 20, 2003, six pages.

Final Office Action mailed May 23, 2007, for U.S. Appl. No. 11/137,753, filed May 25, 2005, 11 pages.

Final Office Action mailed Oct. 18, 2007, for U.S. Appl. No. 11/351,098, filed Feb. 8, 2006, six pages.

Final Office Action mailed Oct. 31, 2007, for U.S. Appl. No. 10/217,798, filed Aug. 12, 2002, nine pages.

Final Office Action mailed Mar. 24, 2009, for U.S. Appl. No. 11/351,098, filed Feb. 8, 2006, 10 pages.

Final Office Action mailed Feb. 10, 2011, for U.S. Appl. No. 11/901,649, filed Sep. 18, 2007, 20 pages.

Final Office Action mailed May 18, 2011, for U.S. Appl. No. 11/978,031, filed Oct. 25, 2007, 17 pages.

Final Office Action mailed Jun. 15, 2011, for U.S. Appl. No. 11/595,071, filed Nov. 8, 2006, 9 pages.

Final Office Action mailed Jun. 24, 2011, for U.S. Appl. No. 11/978,006, filed Oct. 25, 2007, 12 pages.

Final Office Action mailed Jul. 5, 2011, for U.S. Appl. No. 11/977,279, filed Oct. 24, 2007, 12 pages.

Final Office Action mailed Sep. 29, 2011, for U.S. Appl. No. 11/977,911, filed Oct. 26, 2007, 22 pages.

Final Office Action mailed Oct. 11, 2012, for U.S. Appl. No. 12/566,455, filed Sep. 24, 2009, 8 pages.

Final Office Action mailed Oct. 25, 2012, for U.S. Appl. No. 12/568,302, filed Spetember 28, 2009, 13 pages.

Final Office Action mailed Oct. 25, 2012, for U.S. Appl. No. 12/568,316, filed Sep. 28, 2009, 15 pages.

Final Office Action mailed Jul. 26, 2013, for U.S. Appl. No. 13/166,726, filed Jun. 22, 2011, ten pages.

Final Office Action mailed Oct. 31, 2013, for U.S. Appl. No. 13/166,699, filed Jun. 22, 2011, 13 pages.

Hong, S.J. et al. (2005). "Smart LCD Using a-Si Photo Sensor," *IMID'05 Digest* pp. 280-283.

International Preliminary Report on Patentability and Written Opinion mailed Oct. 8, 2004, for PCT Application No. PCT/US03/05300, filed Feb. 20, 2003, 15 pages.

International Preliminary Report on Patentability and Written Opinion mailed Dec. 30, 2004, for PCT Application No. PCT/US02/25573, filed Aug. 12, 2002, 16 pages.

International Preliminary Report on Patentability and Written Opinion mailed May 14, 2008, for PCT Application No. PCT/US06/43741, filed Nov. 10, 2006, four pages.

International Search Report mailed Apr. 14, 2003, for PCT Application No. PCT/US02/25573, filed Aug. 12, 2002 two pages.

(56) References Cited

OTHER PUBLICATIONS

International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
International Search Report mailed Jan. 16, 2013, for PCT Application No. PCT/US2012/043021, filed Jun. 18, 2012, six pages.
International Search Report mailed Sep. 12, 2013, for PCT Application No. PCT/US2013/048977, filed Jul. 1, 2013, six pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Non-Final Office Action mailed Jun. 4, 2003, for U.S. Appl. No. 10/217,798, filed Aug. 12, 2002, 16 pages.
Non-Final Office Action mailed May 21, 2004, for U.S. Appl. No. 10/329,217, filed Dec. 23, 2002, 13 pages.
Non-Final Office Action mailed Sep. 21, 2004, for U.S. Appl. No. 10/442,433, filed May 20, 2003, six pages.
Non-Final Office Action mailed Nov. 26, 2004, for U.S. Appl. No. 10/307,106, filed Nov. 27, 2002, eight pages.
Non-Final Office Action mailed Dec. 10, 2004, for U.S. Appl. No. 10/217,798, filed Aug. 12, 2002, nine pages.
Non-Final Office Action mailed Jan. 21, 2005, for U.S. Appl. No. 10/347,149, filed Jan. 17, 2003, nine pages.
Non-Final Office Action mailed Apr. 15, 2005, for U.S. Appl. No. 10/371,413, filed Feb. 20, 2003, four pages.
Non-Final Office Action mailed Jun. 22, 2005, for U.S. Appl. No. 10/739,455, filed Dec. 17, 2003, 10 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, seven pages.
Non-Final Office Action mailed Aug. 28, 2006, for U.S. Appl. No. 10/371,413, filed Feb. 20, 2003, six pages.
Non-Final Office Action mailed Jun. 28, 2007, for U.S. Appl. No. 11/351,098, filed Feb. 8, 2006, 12 pages.
Non-Final Office Action mailed Jun. 29, 2007, for U.S. Appl. No. 10/217,798, filed Aug. 12, 2002, 10 pages.
Non-Final Office Action mailed Feb. 25, 2008, for U.S. Appl. No. 11/137,753, filed May 25, 2005, 15 pages.
Non-Final Office Action mailed Jun. 24, 2008, for U.S. Appl. No. 11/351,098, filed Feb. 8, 2006, 11 pages.
Non-Final Office Action mailed Jun. 25, 2009, for U.S. Appl. No. 11/980,029, filed Oct. 29, 2007, 9 pages.
Non-Final Office Action mailed Nov. 23, 2009, for U.S. Appl. No. 11/407,545, filed Apr. 19, 2006, five pages.
Non-Final Office Action mailed Jul. 29, 2010, for U.S. Appl. No. 11/901,649, filed Sep. 18, 2007, 20 pages.
Non-Final Office Action mailed Oct. 13, 2010, for U.S. Appl. No. 11/978,006, filed Oct. 25, 2007, eight pages.
Non-Final Office Action mailed Oct. 14, 2010, for U.S. Appl. No. 11/595,071, filed Nov. 8, 2006, seven pages.
Non-Final Office Action mailed Nov. 26, 2010, for U.S. Appl. No. 11/977,279, filed Oct. 24, 2007, nine pages.
Non-Final Office Action mailed Nov. 26, 2010, for U.S. Appl. No. 11/977,830, filed Oct. 26, 2007, seven pages.
Non-Final Office Action mailed Dec. 13, 2010, for U.S. Appl. No. 11/977,339, filed Oct. 24, 2007, eight pages.
Non-Final Office Action mailed Feb. 1, 2011, for U.S. Appl. No. 11/978,031, filed Oct. 25, 2007, 18 pages.
Non-Final Office Action mailed Apr. 29, 2011, for U.S. Appl. No. 11/977,911, filed Oct. 26, 2007, 19 pages.
Non-Final Office Action mailed Jun. 21, 2011, for U.S. Appl. No. 11/977,339, filed Oct. 24, 2007, 10 pages.
Non-Final Office Action mailed Jun. 28, 2011, for U.S. Appl. No. 12/852,883, filed Aug. 8, 2010, 16 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Non-Final Office Action mailed Nov. 17, 2011, for U.S. Appl. No. 11/977,339, filed Oct. 24, 2007, nine pages.
Non-Final Office Action mailed Jan. 10, 2012, for U.S. Appl. No. 11/977,864, filed Oct. 26, 2007, six pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, seven pages.
Non-Final Office Action mailed Nov. 15, 2012, for U.S. Appl. No. 12/566,477, filed Sep. 24, 2009, 11 pages.
Non-Final Office Action mailed Mar. 5, 2013, for U.S. Appl. No. 13/166,726, filed Jun. 22, 2011, 14 pages.
Non-Final Office Action mailed Mar. 29, 2013, for U.S. Appl. No. 13/166,699, filed Jun. 22, 2011, 12 pages.
Non-Final Office Action mailed Jun. 17, 2013, for U.S. Appl. No. 13/166,711, filed Jun. 22, 2011, 8 pages.
Notification of Reasons for Rejection mailed Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Haines, L. (Mar. 23, 2005). "Japanese Enable Human Area Network," *The Register* located at http:/www.theregister.co.uk/2005/03/23/human_area_network/print.html>, last visited Jun. 30, 2009, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 7, 2013, for U.S. Appl. No. 12/960,068, filed Dec. 3, 2010, 24 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Jan. 13, 2014, for U.S. Appl. No. 12/568,316, filed Sep. 28, 2009, 15 pages.
Non-Final Office Action mailed Sep. 18, 2013, for U.S. Appl. No. 13/652,007, filed Oct. 15, 2012, 16 pages.

(56) References Cited

OTHER PUBLICATIONS

Non-Final Office Action mailed Dec. 16, 2013, for U.S. Appl. No. 13/166,711, filed Jun. 22, 2011, 12 pages.
Non-Final Office Action mailed Feb. 27, 2014, for U.S. Appl. No. 11/977,279, filed Oct. 24, 2007, 11 pages.
Non-Final Office Action mailed Mar. 14, 2014, for U.S. Appl. No. 11/977,339, filed Oct. 24, 2007, 10 pages.
Notice of Allowance mailed Feb. 3, 2014, for U.S. Appl. No. 13/166,726, filed Jun. 22, 2011, nine pages.
Final Office Action mailed Apr. 28, 2014, for U.S. Appl. No. 13/652,007, filed Oct. 15, 2012, 16 pages.
Final Office Action mailed Jul. 14, 2014, for U.S. Appl. No. 13/166,711, filed Jun. 22, 2011, 12 pages.
Non-Final Office Action mailed Jun. 27, 2014, for U.S. Appl. No. 13/166,699, filed Jun. 22, 2011, 13 pages.
Search Report dated Jun. 12, 2014, for ROC (Taiwan) Patent Application No. 101122110, one page.
TW Search Report dated Jul. 7, 2014, for TW Patent Application No. 1011221079, filed Jun. 20, 2012, one page.
TW Search Report dated Jul. 8, 2014, for TW Patent Application No. 101122107, filed Jun. 20, 2012, one page.
International Search Report mailed Apr. 23, 2014, for PCT Application No. PCT/US2014/013927, filed Jan. 30, 2014, four pages.
Non-Final Office Action mailed Apr. 24, 2014, for U.S. Appl. No. 13/560,958, filed Jul. 27, 2012, nine pages.
Non-Final Office Action mailed May 8, 2014, for U.S. Appl. No. 13/560,973, filed Jul. 27, 2012, six pages.
Notice of Allowance mailed May 12, 2014, for U.S. Appl. No. 13/166,726, filed Jun. 22, 2011, nine pages.
Notice of Allowance mailed Sep. 4, 2014, for U.S. Appl. No. 13/166,726, filed Jun. 22, 2011, nine pages.
International Search Report mailed Oct. 30, 2014, for PCT Application No. PCT/US2014/047658, filed Jul. 22, 2014, four pages.
Final Office Action mailed Dec. 16, 2014, for U.S. Appl. No. 13/560,958, filed Jul. 27, 2012, 12 pages.
Final Office Action mailed Jan. 12, 2015, for U.S. Appl. No. 13/560,973, filed Jul. 27, 2012, six pages.
Non-Final Office Action mailed Jan. 30, 2015, for U.S. Appl. No. 13/166,711, filed Jun. 22, 2011, 12 pages.
Chinese Search Report dated Oct. 23, 2015, for CN Application No. CN 201280030351.6, with English translation, four pages.
TW Search Report dated Nov. 20, 2015, for TW Patent Application No. 103126285, one page.
Chinese Search Report dated Sep. 6, 2015, for CN Application No. CN 201280030349.9, with English translation, six pages.
Final Office Action mailed Aug. 20, 2015, for U.S. Appl. No. 13/166,711, filed Jun. 22, 2011, six pages.
Non-Final Office Action mailed May 22, 2015, for U.S. Appl. No. 13/831,318, filed Mar. 14, 2013, eight pages.
Non-Final Office Action mailed Aug. 28, 2015, for U.S. Appl. No. 13/560,958, filed Jul. 27, 2012, 11 pages.
Non-Final Office Action mailed Sep. 24, 2015, for U.S. Appl. No. 13/166,699, filed Jun. 22, 2011, 14 pages.
Final Office Action mailed May 4, 2015, for U.S. Appl. No. 13/166,699, filed Jun. 22, 2011, 17 pages.
European Search Report dated May 2, 2016, for EP Application No. 15196245.3, filed Nov. 25, 2015, twelve pages.
Final Office Action mailed Feb. 3, 2016, for U.S. Appl. No. 13/166,699, filed Jun. 22, 2011, 15 pages.
Final Office Action mailed Mar. 9, 2016, for U.S. Appl. No. 13/831,318, filed Mar. 14, 2013, nine pages.
Final Office Action mailed Jun. 3, 2016, for U.S. Appl. No. 14/333,461, filed Jul. 16, 2014, eight pages.
Non-Final Office Action mailed Feb. 11, 2016, for U.S. Appl. No. 14/578,051, filed Dec. 19, 2014, nine pages.
Non-Final Office Action mailed May 13, 2016, for U.S. Appl. No. 15/057,035, filed Feb. 29, 2016, six pages.
Non-Final Office Action mailed May 17, 2016, for U.S. Appl. No. 14/333,382, filed Jul. 16, 2014, sixteen pages.
Notice of Allowance mailed May 24, 2016, for U.S. Appl. No. 13/560,958, filed Jul. 27, 2012, ten pages.
Non-Final Office Action mailed Dec. 4, 2015, for U.S. Appl. No. 14/333,461, filed Jul. 16, 2014, 15 pages.
Notice of Allowance mailed Dec. 15, 2015, for U.S. Appl. No. 13/560,973, filed Jul. 27, 2012, nine pages.
Notice of Allowance mailed Jan. 14, 2016, for U.S. Appl. No. 13/166,711, filed Jun. 22, 2011, five pages.
Non-Final Office Action mailed Jul. 1, 2016, for U.S. Appl. No. 14/333,457, filed Jul. 16, 2014, 27 pages.
Non-Final Office Action mailed Sep. 27, 2016, for U.S. Appl. No. 15/144,615, filed May 2, 2016, five pages.
Non-Final Office Action mailed Oct. 20, 2016, for U.S. Appl. No. 13/166,699, filed Jun. 22, 2011, 16 pages.
Non-Final Office Action mailed Nov. 25, 2016, for U.S. Appl. No. 13/831,318, filed Mar. 14, 2013, eight pages.
Notice of Allowance mailed Aug. 10, 2016, for U.S. Appl. No. 14/578,051, filed Dec. 19, 2014, seven pages.
Notice of Allowance mailed Sep. 9, 2016, for U.S. Appl. No. 13/560,958, filed Jul. 27, 2012, eight pages.
Notice of Allowance mailed Oct. 31, 2016, for U.S. Appl. No. 15/057,035, filed Feb. 29, 2016, ten pages.
TW Search Report dated Jun. 23, 2016, for TW Patent Application No. 104135140, with English Translation, two pages.
Non-Final Office Action mailed Jan. 11, 2017, for U.S. Appl. No. 14/869,982, filed Sep. 29, 2015, nine pages.
Non-Final Office Action mailed Jan. 12, 2017, for U.S. Appl. No. 14/869,980, filed Sep. 29, 2015, ten pages.
Non-Final Office Action mailed Jan. 23, 2017, for U.S. Appl. No. 14/333,382, filed Jul. 16, 2014, sixteen pages.

\* cited by examiner

DEVICE FOR DIGITAL COMMUNICATION THROUGH CAPACITIVE COUPLING

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a large surface area that contacts the touch sensor panel to disturb the stimulation signal sufficiently for touch location to be recognized. However, because of this configuration a stylus that includes a tip with a touch surface with a smaller surface area than a user's finger tip, may not sufficiently disturb the stimulation signal in order for the touch sensor panels to detect a touch location.

Furthermore, in some instances it may be desirable for input devices, such as styli, to be able to transfer data, in addition to the touch location data, to the touch screen. However, due to noise sources, and the capacitance coupling arrangement of typical touch screens, data transfer through a touch screen interface may be unreliable.

SUMMARY

One example of the present disclosure may take the form of a computing device configured to communicate with an input device. The computing device includes a processor, a touch interface, such as a touch screen, and a receiving unit. The touch interface is configured to detect an input signal corresponding to an object approaching or contacting a surface, such as through capacitive coupling. The receiving unit is configured to receive, through the touch interface, at least one input signal from the input device, and the receiving unit amplifies the at least one input signal creating at least one amplified input signal. Additionally, at least one of the processor or the receiving unit analyzes the at least one amplified input signal and creates at least one output digital signal corresponding to the at least one input signal.

Another example of the disclosure may take the form of a method for transmitting digital data to a computing device through a touch interface. The method includes transmitting an activation signal to at least one drive line of the touch interface; receiving by a receiving unit a digital input signal from an input device through at least one sense line of the touch interface; amplifying by the receiving unit the digital input signal; and creating an output digital signal corresponding to the digital input signal.

SPECIFICATION

Overview

Figure 1:
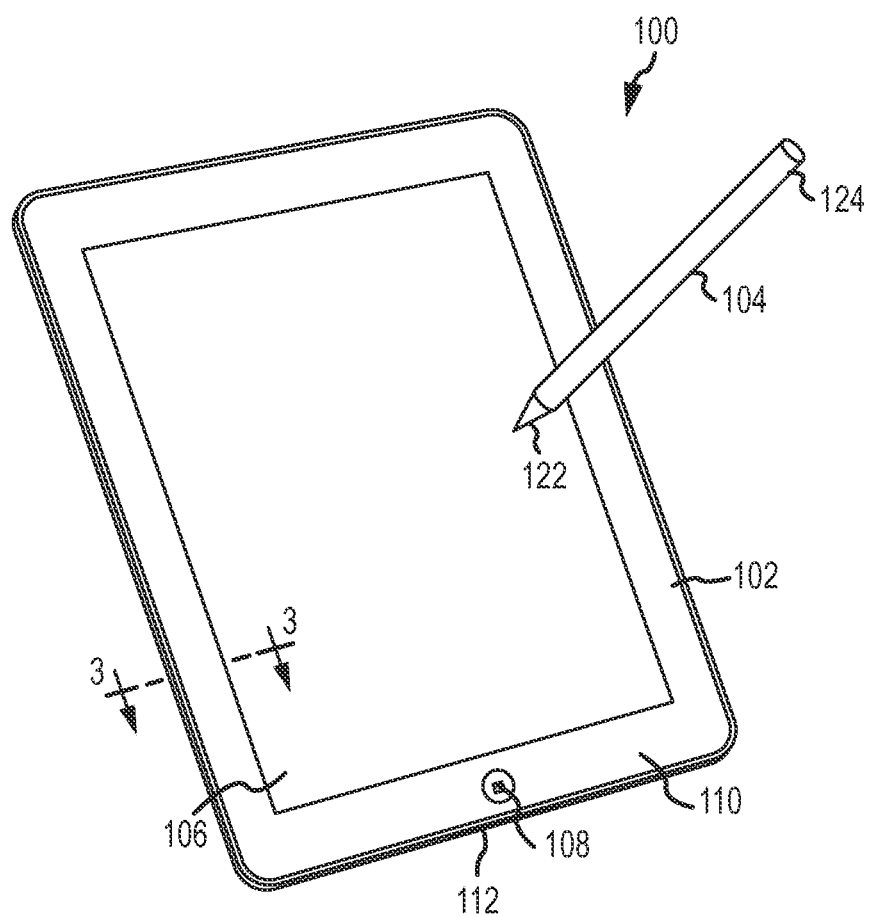
FIG. 1 is a perspective view of a system including a computing device and an input device configured to provide input data to the computing device.

In some embodiments herein, a receiving unit for touch interfaces, such as touch screens, for computing devices is disclosed. The receiving unit may be communicatively coupled to either a sensor panel for the touch screen or to an input device for the touch screen. The receiving unit amplifies a data input signal to allow input devices to provide digital data to the computing device through the touch screen interface.

The receiving unit may allow an input device to have a smaller input surface (such as a stylus) to be used to provide input to the touch screen or interface. For example, in one embodiment, a stylus having a ball point tip may provide input to the touch screen. In this instance, the receiving unit may be able to recover a signal (or interference of the stimulation signal) despite a low capacitive coupling between the surface are of the ball point tip and the touch sensor panel. Thus, the touch screen may sense a location of the stylus ball point tip, although the signal interference may be lower than a typical interference for a user's finger when placed on the touch sensor panel.

The receiving unit may also provide a communication mechanism to receive data other than a touch location. For example, the receiving unit may receive digital data from an input device which may be transferred through the touch screen. In one embodiment, the receiving unit may be a band pass, high pass or low pass amplifier, which may amplify the signal from the input device. In some instances the touch screen may be somewhat bandwidth limited due to the high trace resistance of the sensor panel and the parasitic capacitance to ground. Despite this attenuation of the sensor panel, the gain of the receiving unit may outweigh the attenuation, thus the digital data may be transmitted between the input device and the touch screen.

In some embodiments the receiving unit may allow for input devices to communicate digitally with the touch sensor panel. For example, the touch screen may perform a scan for touch events, such as touches on the screen by a user's fingers. Once the touch sensor panel has been scanned for general touch events, the touch sensor panel may send out an excitation signal to the input device, and then switch to a data or stylus mode. As the input device receives the excitation signal, the input device may transmit digital data to the touch screen. The digital data may include information from one or more sensors of the input device (e.g., accelerometers, force or pressure sensors, gyroscopes), as well as other information about the input device (e.g., power level). As a specific example, if the input device is a stylus, the additional data may allow the computing device to display a thicker line depending on how forceful a user presses the stylus to the touch sensor panel, vary a line appearance "drawn" depending on an angle of the stylus, or the like.

In many instances, the input device may transmit the digital data at a frequency that is different from and separated (in frequency) from the frequency used by the touch screen to scan for touch events. This frequency difference allows the touch screen to scan for touch events and digital data (from the input device) substantially simultaneously in time. Additionally or alternatively, the frequency used by the input device can be used as a signature to identify the digital data separately from the touch data.

In instances where the digital data and the touch events are temporally separated, it may be advantageous to configure the frequency of the transmitted digital data to have a higher frequency band than the scanning frequency of the touch panel. This configuration may allow the input device to send digital data over a shorter time period, which may increase the time for the scanning of touch events where the acquisition signal to noise ratio (SNR) is dependent on the amount of time dedicated to it. Further, by decreasing the transmission time for the digital data, and thus increasing the scanning time for touch events, the chances of touch events occurring only while the touch screen is scanning for digital data from the input device may be reduced, therefore reducing the chances that a touch event may be missed by the touch scanning performed by the touch screen. Moreover, a shorter digital data scanning time may also reduce the static power usage during the digital data scan time to support the digital data hardware or receiving unit. That is, the shorter time frame in which the receiver may be required to be activated, the more power the electronic device may save.

In some embodiments, the touch screen or sensor panel may act to transmit digital data to the input device. In other words, the touch screen may function as a digital data transmitter and the input device may include the receiving unit, thus digital data may be transmitted from the touch screen or sensor panel to the input device. In these embodiments, the digital data may include one or more commands or context information that may be used by the input device to modify the duty cycle (or other characteristics) or one more sensors in order to save power, enter specific operating modes specific for the touch screen model (or the software running on the panel), enter specific operating modes specific to the current location on touch screen panel, or the like. As another example, digital data transferred from the touch screen to the input device may be an acknowledgement from the touch screen that the previous data sent by the input device was received without error. In these embodiments, the system may allow the input device and the touch screen to have bi-directional communication, to transfer data back and forth between the two devices. The bi-directional system may be full duplex or half duplex. Alternatively, the system may be a unidirectional system and one device may be selected as the receiving device and one device may be selected as the transmitting device.

Detailed Description

Turning now to the figures, a communication system including a computing device and an input device will be discussed in more detail. FIG. 1 is a perspective view of an input system 100 including an input device 104 in communication with a computing device 102 by a touch screen 106. The computing device 102 may be substantially any type of electronic device including a capacitive input mechanism, such as the touch screen 106 or other touch interface. For example, the computing device 102 may be a laptop computer, a tablet computer, a smartphone, a digital music player, portable gaming station, or the like. Although not shown, the computing device 102 may include one or more components of a typical electronic or computing device, such as a processor, to provide control or provide other functions for the device 102. Some illustrative components for operating and communicating with the touch screen 106 are discussed in more detail below with respect to FIG. 4.

The computing device 102 may include the touch screen 106, an enclosure 110, and/or one or more input buttons 108. The enclosure 110 encloses one or more components of the computing device 102, as well as may surround and/or secure a portion of the touch screen 106 to the computing device 102. The one or more input buttons 108 may provide input functions to the computing device 102. For example, the input buttons 108 may adjust a volume for the computing device 102, turn the computing device 102 on or off, or may provide other inputs for the computing device 102. Further, the computing device 100 may also include one or more receiving ports 112. The receiving ports 112 may receive one or more plugs or connectors, such as but not limited to, a universal serial bus (USB) cable, a tip ring sleeve connector, or the like.

The touch screen 106 may include one or more sensors in order to detect one or more input or location signals. Additionally, the touch screen 106 may include a display screen to provide a graphical user interface, and other video and/or image output for the computing device 102. The touch screen 106 and other components of the computing device 102 will be discussed in more detail below.

Figure 2:
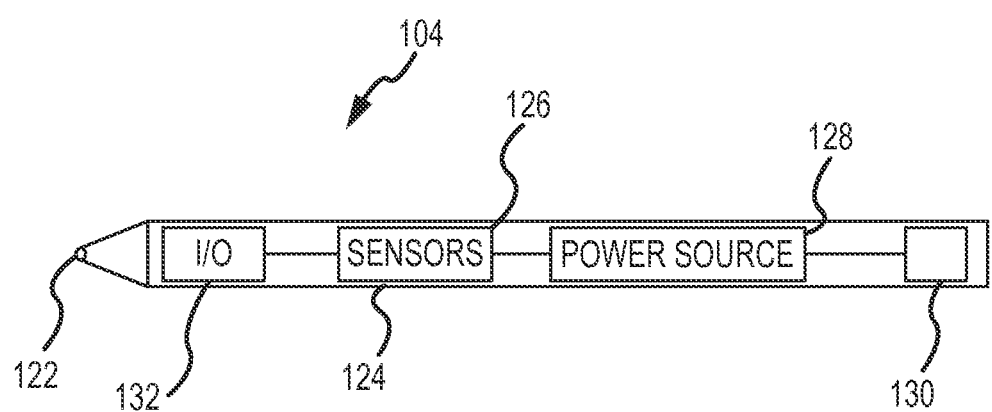
FIG. 2 is an exemplary block diagram of the input device of FIG. 1.

Turning to FIG. 2, the input device 104 will be discussed in more detail. The input device 104 may be configured to be in communication with the computing device 102, specifically through the touch screen 106, discussed in more detail below. FIG. 2 is an exemplary block diagram of the input device 104. With reference to FIGS. 1 and 2, in some embodiments, the input device 104 may be in the form a stylus, and may have a generally elongated main body 124 with a tip 122 at a first end. The tip 122 may be configured to be traced along the touch screen 106. For example, the tip 122 may be a generally resilient material, which may deform upon pressure, and can slide along the surface of the touch screen 106.

The tip 122 may be a conductive material, or another material laced with a conductive material, in order to may interact with the touch screen 106 and specifically one or more electrode layers (discussed below) to provide input to the computing device 102. Additionally, the tip 122 may be configured to transmit one more signals, such as voltage signals, to the touch screen 106. For example, the tip 122 may be communicatively coupled to a power source 128, which may provide one or more voltages to the tip 122 to transmit to the touch screen 106. The tip 122 may be made of metals such as aluminum, brass or steel, as well as conductive rubber, plastic or other materials doped with conductive particles.

With continued reference to FIG. 2, the input device 104 may also include one more sensors 126. In some instances the sensors 126 may be configured to detect one more stimuli of the tip 122, the body 124, or other areas of the input device 104. For example, the one more sensors 126 may include an accelerometer, a gyroscope, a pressure or force sensor, and so on. In these instances, the sensors 128 may be configured to detect changes in the angle a user may hold the input device 104, a force that the user presses the tip 122 against the touch screen 106, an acceleration of the tip 122 along the touch screen 106, and so on. Additionally, the power source 128 may further provide power to the one or more sensors 128, as necessary or desired.

The input device 104 may also include a processor 130 to control select functions of the input device 104. For example, the processor 130 may control certain functions of the sensors 128. In some embodiments, the processor 130 may determine one or more input signals that may be transmitted through the tip 122 to the touch screen 106 and/or computing device 102.

Optionally, the input device 104 may also include an input/output (I/O) interface 132. The I/O interface 132 may receive and/or transmit one or more signals to and from the input device 104. For example, the I/O interface 132 may receive one or more radio signals (e.g., Bluetooth), or may be configured to receive one or more electrical (digital and/or analog) signals transmitted from the computing device 102. In the latter example, the I/O interface 132 may be used in conjunction with or instead of the tip 122 to transmit and/or receive signals from the touch screen 106. For example, the I/O interface 132 may be configured to receive one or more voltage signals from the touch screen 106 (e.g., through the drive lines, discussed in more detail below). Additionally, the I/O interface 132 may include a voltage source in order transmit (optionally via the tip 122) one or more signals to the touch screen 106 and/or computing device 102.

Figure 3:
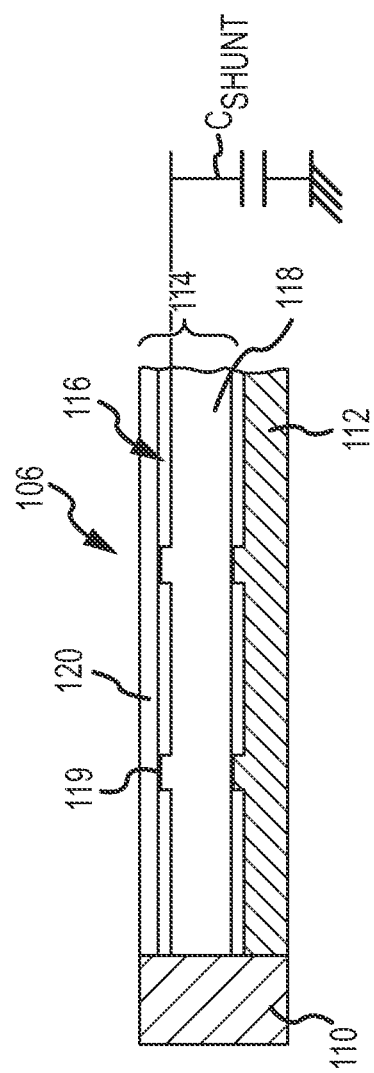
FIG. 3 is a cross-section view of a touch screen of the computing device taken along line 3-3 in FIG. 1.

The touch screen 106 will now be discussed in more detail. FIG. 3 is a cross-section view of the touch screen 106 taken along line 3-3 in FIG. 1. The touch screen 106 is configured to receive inputs from an object (e.g., location information based on a user's finger or data from the input device) and to send this information to a processor. The touch screen 106 may report touches to the processor and the processor interprets the touches in accordance with its programming. For example, the processor may initiate a task in accordance with a particular touch. The touch screen 106 may include a display screen 112 and a sensor panel 114 positioned at least partially over the display screen 112. The display screen 112 is configured to display one or more output images and/or videos for the computing device 102. The display screen 112 may be substantially any type of display mechanism, such as a liquid crystal display (LCD), plasma display, or the like. In instances where the display screen 112 is a LCD display, the display screen 112 may include (not shown) various layers such a fluorescent panel, one or more polarizing filters, a layer of liquid crystal cells, a color filter, or the like. It should be noted that FIG. 3 is not drawn to scale and is a schematic view of the touch screen.

The sensor panel 114 may include an electrode layer 116 operably connected to a sensor glass 118 or other type of support structure. The electrodes 116 may be connected to one or both sides of the sensor glass 118. As one example, the electrodes 116 may be positioned on a first side of the sensor glass 118, and the other side of the glass may be coated to form a ground shield. As another example, the sensor glass 118 may be formed of multiple layers of polyethylene terephthalate (PET), with each layer including electrodes 116 operably connected to one side of the layer, and then each of the layers may be stacked to form rows, columns, and/or shield layers.

With continued reference to FIG. 3, the sensor glass 118 may form a portion of the display screen 112 or may be separate therefrom. The sensor glass 118 may be a relatively clear element that may protect the display screen 112 from forces that may be exerted on the sensor panel 114 by a user or input device. In some embodiments, the sensor glass 118 may be a clear glass panel that may allow the display screen 112 to be viewable therethrough. The electrode layer 116 may include one or more electrodes which may be deposited on the sensor glass 118. For example, the electrode layer 116 may include transparent conductive materials and pattern techniques such as ITO and printing. It should be noted that the electrode layer 116 may include a plurality of electrodes separated by gaps, where the electrodes are interconnected by one or more traces or other electrical elements.

In some embodiments, the sensor glass 118 may act as a ground shield to electronically isolate the electrode layer 116 from the display screen 112 and/or other internal components of the computing device 102 (such a processor, or electronic circuits). Typically it may be desirable for the touch screen 106 to have a relatively low vertical height, so that the height and size of the computing device 102 may be reduced. In these instances, the sensor glass 118 and/or other ground shield may be relatively close to the electrode layer 116, which may cause a large shunt capacitance illustrated as Cshunt, defined between the sensor glass 118 and the electrode layer 116. In some instances, Cshunt may be approximately 100 pF, which, as discussed in more detail below, may act to reduce input signals from input devices to the touch screen 106.

The electrode layer 116 may include one or two layers of electrodes which may be spaced apart across the layer 116. The electrodes, discussed in more detail with respect to FIG. 4, may define one or more nodes 144 that act as capacitive coupling sensors to detect touches on the touch screen 106.

The number and configuration of the nodes 144 may be varied, depending on the desired sensitivity of the touch screen 106.

The touch screen 106 may also include a cover sheet 120 disposed over the electrode layer 116. Thus, the electrode layer 116 may be substantially sandwiched between the cover sheet 120 and the sensor glass 118. The cover sheet 120 protects the other layers of the touch screen 106, while also acting to insulate the electrode layer 116 from external elements (such as fingers or input devices that may contact the cover sheet 120). The cover sheet 120 may generally be formed from substantially any suitable clear material, such as glass or plastic. Additionally, typically the cover sheet 120 should be sufficiently thin to allow for sufficient electrode coupling between the electrode layer 118 and any external input objects (e.g., fingers, input devices). For example, the cover sheet 120 may have a thickness ranging between 0.3 to 2 mm.

It should be noted that in some embodiments, the touch screen 106 may be substantially any type of touch interface. For example, the touch interface may not be see-through and/or may not correspond to a display screen. In these instances, a particular surface or group of surfaces may be configured to receive touch inputs, that may or may not correspond to a separately displayed user interface, icons, or the like.

Figure 4:
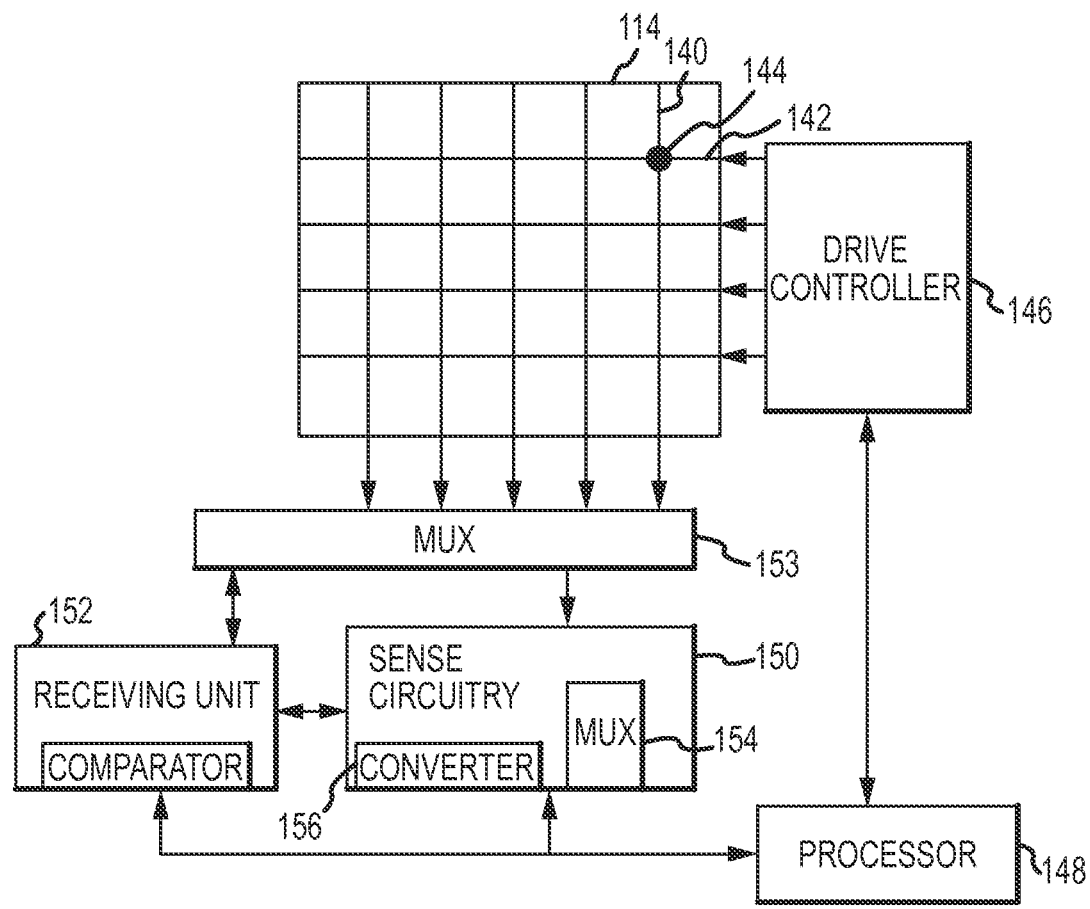
FIG. 4 is a block diagram of the computing device of FIG. 1.

Operation of the touch screen 106 will now be discussed in more detail. FIG. 4 is an illustrative block diagram of the computing device 102 and touch screen 106. The sensor panel 114 of the touch screen 106 may be configured to detect touches on the surface of the touch screen 106 by changes in capacitance. Typically when two electrically conductive members come close to one another, without actually touching, their electric fields interact to form a capacitance. With reference to FIG. 4, a sensing node 144 formed by one or more electrodes (explained below) may form a first electrically conductive member and an object, such as a finger of the user, may form a second electrically conductive member. The sensor panel 114 of the touch screen 106 may be configured as in a self capacitance arrangement or in a mutual capacitance arrangement.

In the self capacitance arrangement, the electrode layer 116 may include a single layer of a plurality of electrodes spaced in a grid or other coordinate system (e.g., Polar) where each electrode may form a node 144. The sensing circuit 150 monitors changes in capacitance that may occur at each node 144, which typically occurs at a node 144 when a user places an object (e.g., finger or tip 122 of the input device 104) in close proximity to the electrode.

With continued reference to FIG. 4, in a mutual capacitance system, the electrode layer 116 may include electrodes separated into two layers forming drive lines 142 and sense lines 140. The drive lines 142 may be formed on a first layer of the electrode layer 116 and the sense lines 140 may be formed on a second layer of the electrode layer 116. The nodes 144 for the sensor panel 114 may be defined at locations of the electrode layer 116 where the drive lines 142 may cross the sense lines 140 (although in different layers). The sense lines 140 may intersect the drive lines 142 in a variety of manners. For example, in one embodiment, the sense lines 140 are perpendicular to the drive lines 142, thus forming nodes 144 with x and y coordinates. However, other coordinate systems can also be used, and the coordinates of the nodes 144 may be differently defined.

A drive controller 146 is connected to each of the drive lines 142. The drive controller 146 provides a stimulation signal (e.g., voltage) to the drive lines 142. The sensing circuit 150 is connected to each of the sense lines 140 and the sensing circuit 150 acts to detect changes in capacitance at the nodes 144. During operation, the stimulation signal is applied to the drive lines 142 and due to the capacitive coupling between the drive lines 142 and sensing rows 140, a current is carried through to the sense lines 140 at each of the nodes 144. The sensing circuit 150 then monitors changes in capacitance at each of the nodes 144. As with the self-capacitance, a change in capacitance at each of the nodes 144 typically occurs when a user places an object such as a finger in close proximity to the node 144 as the object typically steals a charge, affecting the capacitance of the node 144.

In a specific embodiment, each drive line 140 may be driven separately, such that the drive controller 146 may selectively apply the stimulation signal to drive lines 140. Each drive line 140 may be driven sequentially until the entire set of drive lines 140 has been driven. Although the drive lines 140 are driven individually, the sensing circuit 150 may sense changes of capacitance along all of the sense lines 142 in parallel. In this manner, the coordinates of a touch node 144 may be more easily determined. It should also be noted that, in some instances, a stimulation or excitation signal may be applied to the electrode layer 116 by the input device 104, rather than or in addition to the drive controller 146. This will be discussed in more detail below, but briefly, the input device 104 may apply a voltage similar to the stimulation signal in order to induce a current through the sense lines 142, and create a capacitive coupling within the electrode layer 116.

In either the self-capacitance or mutual capacitance arrangements discussed above, the sensing circuit 150 can detect changes in capacitance at each node 144. This may allow the sensing circuit 150 to determine when and where a user has touched various surfaces of the touch screen 106 with one or more objects. The sensing circuit 150 may include one more sensors for each of the sense lines 142 and may then communicate data to a processor 148. In one example, the sensing circuit 150 may convert the analog capacitive signals to digital data and then transmit the digital data to the processor 148. In other examples, the sensing circuit 150 may transmit the analog capacitance signals to the processor 148, which may then convert the data to a digital form. Further, it should be noted that the sensing circuit 150 may include individual sensors for each sensing line 142 or a single sensor for all of the sense lines 142. The sensing circuit 150 may report a location of the node 144, as well as the intensity of the capacitance (or changed thereof) at the node 144.

With reference to FIG. 4, the sensing circuit 150 may also include a multiplexer 154. The multiplexer 154 may be configured to perform time multiplexing for the sense lines 142. For example, the sensing circuit 150 may receive signals from each of the nodes 144 along the sense lines 142 at approximately the same time, the multiplexer 154 stores the incoming signals and then may release the signals sequentially to the processor 148 one at a time. In some embodiments, the multiplexer 154 may also multiplex the drive lines to be used as sense lines, in order to determine a location of the input device, discussed in more detail below.

The sensing circuit 150 may also include a converter 156. The converter 156 transforms signals from a first signal to a second signal. For example, the converter 156 may transform analog signals to digital signals. As specific example, the converter 156 may receive voltage signals from the sense lines 142 which may vary based on the amount of capacitive coupling at each of the nodes 144 and may transform those voltage signals into digital signals.

In some instances, the capacitive coupling for the touch screen 106, and specifically the electrode layer 116 may be determined by the physical geometry of the touch screen 106 and the object communicating with the touch screen 106. For example, the larger an object may be the larger change in capacitance may be detected, thus increasing the size of the object may increase the touch screen's ability to detect a touch signal by that object. In some embodiments, it may be desirable for the input device 104, to have a relatively small tip 122 diameter. For example, in some embodiments, the tip 122 may have a diameter ranging between 1-2 mm. In these embodiments, the capacitive coupling with the touch screen 106 may be much lower than a larger object, such as a finger. As such, in instances where the touch screen 106 may be configured to detect finger touches, touch signals input by the input device 104 may be more difficult to detect using the sense lines 142 and sensing circuit 150 alone.

Additionally, with reference to FIG. 3, in some touch screen 106 implementations, the Cshunt, which may be created due to the reduced vertical height of the touch screen 106, may be large, e.g., approximately 100 pF. That is, in some instances the ground shield of the touch screen 106 may be as close as possible to the electrodes, which can cause a large shunt capacitance, Cshunt. The low capacitive coupling of the input device 104 (when it includes a relatively smaller tip 122) in addition to the large Cshunt values may act to reduce the input signals of the input device 104 detectable by the touch screen 106. Also, in embodiments where the electrode layer 116 may include ITO electrodes, each electrode may have a relatively high resistance, e.g., in the hundreds of kΩ range. In these embodiments, the resistance of the electrodes along with the value of Cshunt may create a low pass filter. The created low pass filter may act to limit a frequency of the stimulation signal applied to the drive lines 140 by the drive controller 146, which may therefore act to limit a data transfer rate between the input device 104 and the computing device 102. Further, in some instances the values of the resistance of each electrode within the electrode layer 116, as well as Cshunt may be different at each node 144. These type of changes at each node 144 may result in phase shifting between nodes 144, which may further impact input signals from the input device 104.

Returning to FIG. 4, the computing device 102 and/or the input device 104 (as discussed in more detail below) may include a receiving unit 152. The receiving unit 152 may be selectively coupled to the sense lines 142 in order to allow the input device 104 to more accurately communicate with the computing device 102. Additionally, the receiving unit 152 may allow the input device 104 to communicate additional data to and/or from the computing device 102 via the touch screen 106. The receiving unit 152 may increase a signal from the input device 104 in order to overcome the small diameter of the tip 122, the large Cshunt, and/or the various changes in phase between nodes 144.

The receiving unit 152 may be combined with or replace the sensing circuit 150 and processor 148 to recover data which may be input by the input device 104 to the touch screen 106. Additionally, as explained in more detail below, the receiving unit 152 may also allow frequency communication above typical touch surface 106 excitation frequencies (approximately 500 kHz). The receiving unit 152 may further minimize any phase differences between nodes 144 across the area of the touch screen 106.

The receiving unit 152 may be communicatively coupled to the sense lines 142, and may be incorporated into the sensing circuit 150 or separate therefrom. For example, as shown in FIG. 4, a separate multiplexer 153, which may be a time-division multiplexer may be coupled between the sense lines 152 and the sensing circuit 150 and the receiving unit 152. In this manner, while the input device 104 may be transmitting data to the touch screen 106, the receiving unit 152 may receive the output from the sense lines 142 and when the input device 104 may not be transmitting data, the sensing circuit 150 may receive output from the sense lines 142.

Figure 5:
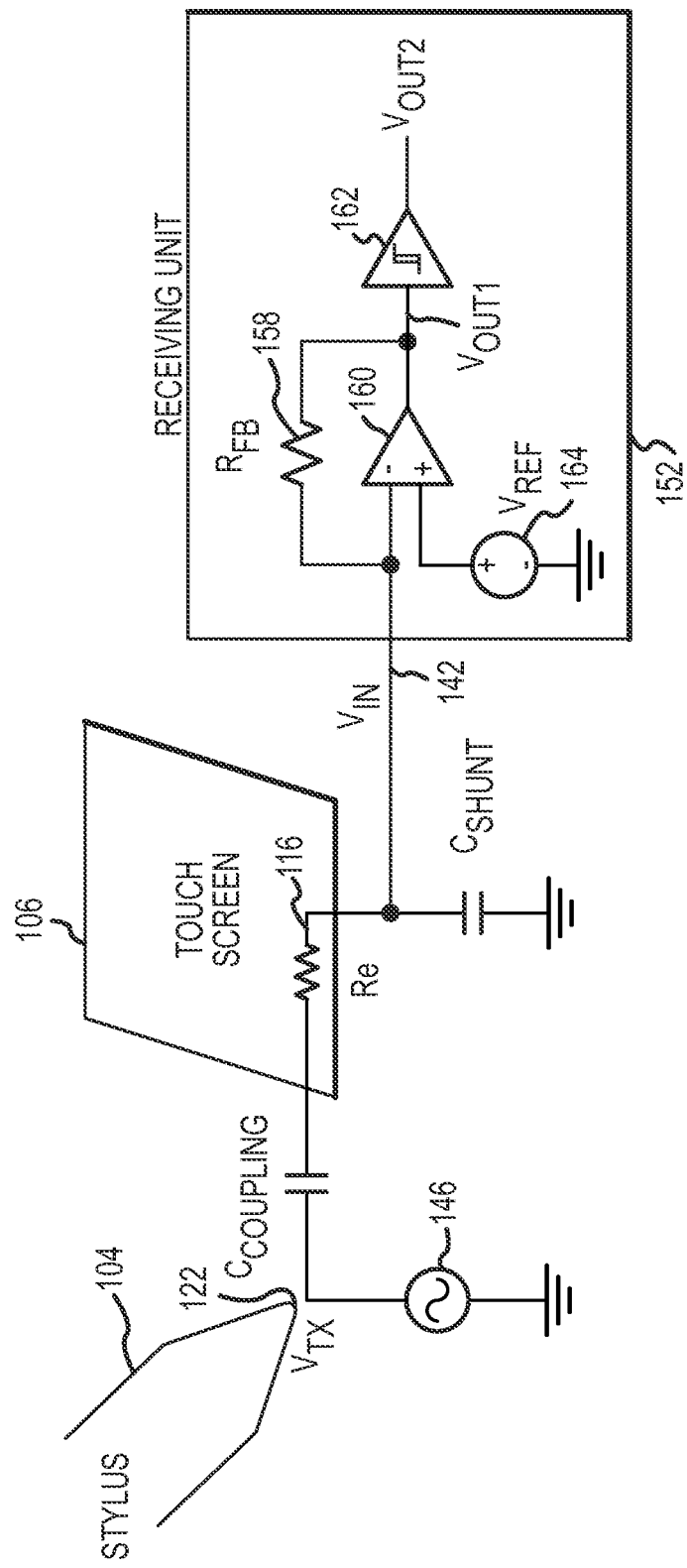
FIG. 5 is a simplified block diagram of the system of FIG. 1 during the transmission of data between the input device and the computing device.

In some embodiments, the receiving unit 152 may be a high pass amplifier. FIG. 5 is a simplified schematic diagram of the input system 100 including the input device 104, the touch screen 102 of the computing device 102, and the receiving unit 152. The receiving unit 152 may be substantially any type of active high pass filter. For example, as shown in FIG. 5, the receiving unit 152 may include an operational amplifier 160, a feedback resistor 158, and a reference voltage source 152. In this embodiment, an inverting input of the operational amplifier 160 may be communicatively coupled to the sense lines 142 and receive input signals input by the input device 104, i.e., changes in capacitance on particular nodes 144; and, a non-inverting input of the operation amplifier 160 may be communicatively coupled to the reference voltage source 152. The feedback resistor 158 may provide feedback between a Vout1 and the inverting input to the operational amplifier 160.

The receiving unit 152 may receive a sensing signal Vin or input signal from the sense lines 142 and high pass filter the signal Vin to produce a first output signal Vout1, which may also be considered the amplified input signal. Additionally, in some embodiments, the receiving unit 152 may be in communication with or may include a comparator 162. The comparator 162 may convert Vout1 or the amplified input signal to a digital output signal Vout2 or a reconstructed input signal. For example, the comparator 162 may be a Schmitt trigger or other threshold circuit having a positive feedback with a loop gain that is more than one. However, in other embodiments, other types of converters, comparators, or converter circuits may be used that may reconstruct a digital signal from an analog signal.

With reference to FIG. 5, the receiving unit 152 may be configured to apply a gain to the high frequency components of Vin or the input signal, which may allow the input signals from the sense lines 142 (as input by the input device 104) to overcome the low pass characteristics of the touch screen 106. This is because the receiving unit 152 may function to pass high frequency signals of Vin through, while acting to attenuate low frequency signals. In some embodiments, the high gain of the receiving unit 152 for high frequency signals may distort the input signal Vin. Although this distortion may increase the signal to noise ratio (SNR), the distortion may not significantly affect the digital signal. For instance, the comparator 162 or converter may reconstruct the input signal by analyzing peaks and valleys of the Vin gained or the amplified signal to convert the amplified signal back to a digital signal (that is, the signal which was originally transmitted from the input device 104).

Operation of the system 100 and the receiving unit 152 will now be discussed in more detail. As shown in FIG. 5, the drive controller 146, which provides a stimulation signal to the drive lines 140, may be represented as a voltage source because the stimulation signal typically will be a voltage applied to the drive lines 140. The input device 104, and specifically the tip 122, may interact with the electrode layer 116 of the touch screen to form a capacitive Coupling. As described above, in some instances the electrodes of the electrode layer 116 may include a resistive component, illustrated as Re in FIG. 5. The receiving unit 150 may be connected to the sense lines 142, which may allow the signal Vin to be a virtual ground, which may negate the effect of Cshunt.

When the touch screen 106 may be in stylus scan mode, discussed in more detail below with respect to FIG. 6, the input device 104 may apply an input signal to the drive lines 140, which may act as an activation or excitation signal which may replace a signal applied by the drive controller 146. The activation signal may induce a current within the sense lines 142, similar to when the drive controller 146 applies the stimulation signal. The sense lines 142 may then detect changes in capacitance of Ccoupling between the input device 104 and the touch screen 106. The sense lines 142 are in communication with the receiving unit 152, which may then amplify the signal from the input device 104. The node 144 with the strongest signal from the input device 104 may be determined to be the location of the tip 122, and the signal may be reconstructed by the comparator 162 to determine the digital data encoded therein. For example, the sense lines 142 may determine the horizontal location of the tip 122 and the drive lines 140 may be temporarily converted to "sense" lines (e.g., by being multiplexed into the sense controller) in order to determine the vertical location of the tip 122. The horizontal location and the vertical location may be combined to provide a tip location on the touch screen 106.

In some embodiments, the location of the input device 104 may be determined during touch mode (or touch scanning), discussed below, and the input device 104 activation signal may be used to transmit digital data other than location to the touch screen 106. In yet other embodiments, the input device 104 may listen to the touch screen to the drive pattern to determine its position along the vertical axis of the touch screen, and then transmit location data to the touch screen in addition to other types of data.

A method for using the input device 104 and the computing device 102 to transmit digital information between the two will now be discussed. FIG. 6 is a flow chart illustrating a method for transmitting digital data between the input device 104 and the computing device 102 through the touch screen 106. The method 200 may begin with operation 202 and the touch screen may be in touch mode and may scan for a touch event. For example, the drive controller 146 may apply the stimulation signal to each drive lines 140 in sequential order, along the length (or other desired dimension) of the touch screen 106. As each of the drive lines 140 are activated, the sensing circuit 150 analyzes each of the sense lines 142 to determine if any of the nodes 144 have had a change capacitance. As discussed above, a touch event may be detected as an object, such as a user's finger, may approach one of the nodes 144 and "steal" capacitance from the electrode pairs, reducing a signal along the sense lines 142 at that node 144.

If a touch event is detected in operation 204, the method 200 may proceed to operation 206 and the sensing circuit 150 may capture and/or analyze the touch data. For example, based on the signal strength along the sense lines 142, the sensing circuit 150 may determine a location of the touch event, as well as other data, such as but not limited to, pressure, time of touch, and so on.

After operations 204 or 206, the method 200 may proceed to operation 208 and the touch screen 106, specifically the drive controller 146, may send out an activation signal. The activation signal sent during stylus mode may be a voltage which may be applied across the drive lines 140. In instances where the tip 122 of the input device 104 may be in contact with the touch screen 106, as the drive controller 146 sends the activation signal, the input device 104 may receive the signal. For example, the I/O receiver 132 may include a circuit or component which may be in communication with the touch panel screen 106 so as to receive the activation signal. As one example, the input device may include an electrode (or other sensor) on the tip 122 which may receive the activation signal. Additionally, in some instances, the tip 122 may be in communication with a receiver or amplifier which may receive and/or amplify the activation signal.

The activation signal may allow the touch screen 106 and the input device 104 to be synchronized for transmission of the input data. As will be explained in more detail below, the input data may include digital data which may be encoded within an analog signal, and therefore, in order for the digital data to be received by the receiving unit 152 in a proper order, the input device 104 and the touch screen 106 may need to be synchronized. Thus, in addition to altering the input device 104 to transmit input data, the activation signal may also allow the receiving unit 152 to more accurately receive the digital data transmitted by the input device 104.

Before, after, or as the activation signal is transmitted across the drive lines 140, the method 200 may proceed to operation 210. It should be noted that although as shown in FIG. 6 the touch scan may complete scanning each of the rows prior to the method proceeding to stylus or data mode, in some embodiments, the touch screen may alternate scanning modes (between touch and stylus) between rows, or otherwise may interweave the two types of scans together. In operation 210, the touch screen 106 may switch from a touch scanning mode to a data communication or stylus mode. For example, the multiplexer 153 may switch the output from the sense lines 142 from communicating with the sensing circuit 150 to communicate with the receiving unit 152. In this manner, the receiving unit 152 may be placed into communication with the output from each of the sense lines 142.

Once the touch screen 106 is in stylus mode, the method 200 may proceed to operation 211. In operation 211, the touch screen 106 may scan for the input device 104. For example, the touch screen 106 may check for inputs to each of the scan lines to determine if the input device 104 is broadcasting. As will be discussed in more detail below, the touch screen 106 may scan for a beacon or excitation signal that may be emitted from the input device 104 prior to transmitting the digital data.

Figure 7:
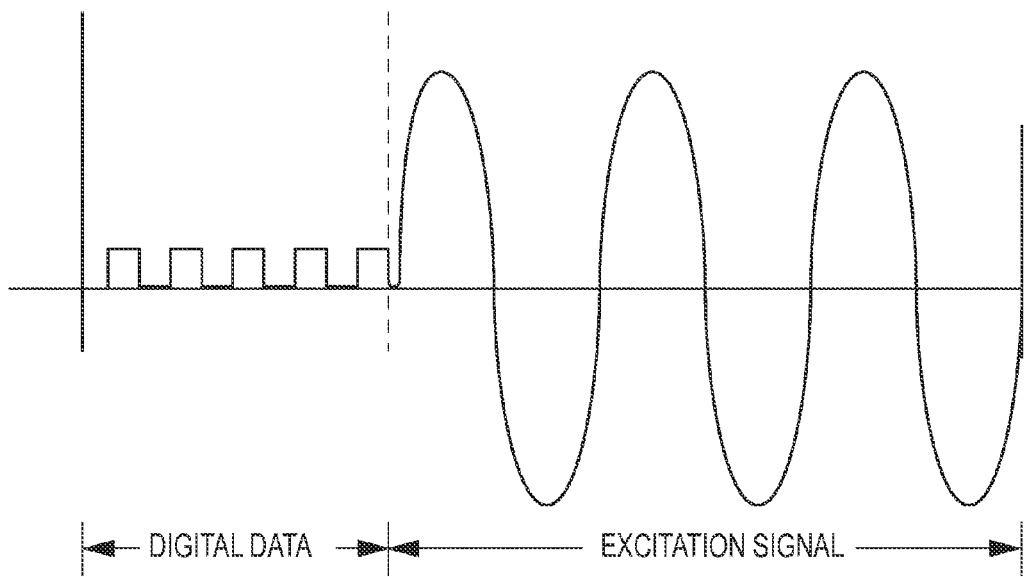
FIG. 7 is a diagram of an illustrative input data signal from the input device to the computing device including an excitation portion and a data portion.

In operation 212, the touch screen 106, and specifically, the receiving unit 152, may receive input data from the input device 104 (if it is transmitting). FIG. 7 is a diagram of one embodiment of a transmission format for the input data. As shown in FIG. 7, in some embodiments, the input data may include an excitation signal which may have a larger amplitude than the data portion of the input signal. Initially, the touch screen 106 may receive the excitation signal from the input device 104, which may be used by the touch screen 106 to determine the location of the tip 122. In other words, the excitation signal may allow the input device to broadcast a "beacon" to the touch screen to alert the touch screen to the location of the tip 122. The excitation signal may have an increased amplitude as compared to the amplitude which may be required to transmit the digital data. As the excitation signal is being broadcast, the sense lines 142 that are closest to the excitation source (e.g., tip 122) will receive a higher amplitude of the excitation signal than the sense lines that are farther away from the excitation source. That is, the excitation signal will decrease as it travels away from the input device, thus the closer the sensor is to the excitation signal source (location of the input device), the larger the value of the excitation signal that will be received by that sensor. The touch screen may interpolate the signals from two or more of the sense lines 140 and/or drive lines (that are configured to receive a signal) to determine the beacon location, and thus the location of the input device. As one example, the device may use interpolation and/or centroid calculations to determine the location of the excitation signal based on the varying values of the excitation signal received at differently positioned sense lines.

In some embodiments, it may be desirable for the excitation signal to have an increased amplitude as compared to other signals from the input device. This may allow the touch screen to more accurately determine the location of the tip, as the larger the excitation signal the more likely it may be received by multiple sense lines, which can be evaluated to determine the location. On the contrary, (as shown in FIG. 7) the input device may use a lower amplitude signal for transmitting the digital data, as any one sense line (closest to the tip) that can pick up the signal may be sufficient to extracting the digital data. Generally, the digital data signal may not require a specific amplitude resolution, as long as the signal meets the binary threshold of the receiver in order for data to be detected, as such the digital data signal may have a reduced amplitude as compared to the excitation signal.

After the excitation signal is received, the touch screen may receive digital data transmitted from the input device 104. The input data transmitted by the input device may include data corresponding to sensors 126 within the input device 104, the location of the input device 104, and so on. In some embodiments, the input data from the input device 104 may act as a separate stimulation or drive signal for the drive lines 140 and/or sense lines 142. In this embodiment, the touch screen 106 may not "scan" sequentially across the drive lines 140 as when in touch mode. This is because the stimulation signal may directly applied to select notes by the input device 104 itself and so only the nodes 144 receiving a signal may produce an input; thus, each driving line 140 may not need to be separately activated. Further, in these embodiments, each node 144 may be configured to detect an input signal from the input device 104, as each node may be stimulated by the input device 104 itself, rather than along the rows of the drive lines 140.

Referring again to FIG. 6, as the input device 104 is transmitting the input data, the signals along the sense lines 142 may vary with the changes in voltages (or other signals) used to transmit the input data. As the sense lines 142, and specifically, select nodes 144, vary their output, the receiving unit 152 may receive the output from each of the sense lines 142. For example, the sense lines 142 may be communicatively connected to the receiving unit 152, so that as each sensing line 142 has a changed output, the output may be provided to the receiving unit 152. As discussed above, the input data from the input device 104 may then be transformed back into digital data, either by the comparator 162 within the receiving unit (see FIG. 5), by the processor 148, or by other comparator or analog to digital converter. The input data may then be transferred or otherwise provided to the processor 148 of the computing device 102.

As the input device 104 completes transmitting data, the method 200 may proceed to operation 214 and the touch screen 106 may receive a termination signal. The termination signal may be sent from the input device 104 to indicate to the touch screen 106 that it has a completed transmitting input data. In some embodiments, the termination signal may be embedded within the input data, e.g., a series of digital data at the end of the transmission like end-of-data bit, sequence number or etc.

Figure 8:
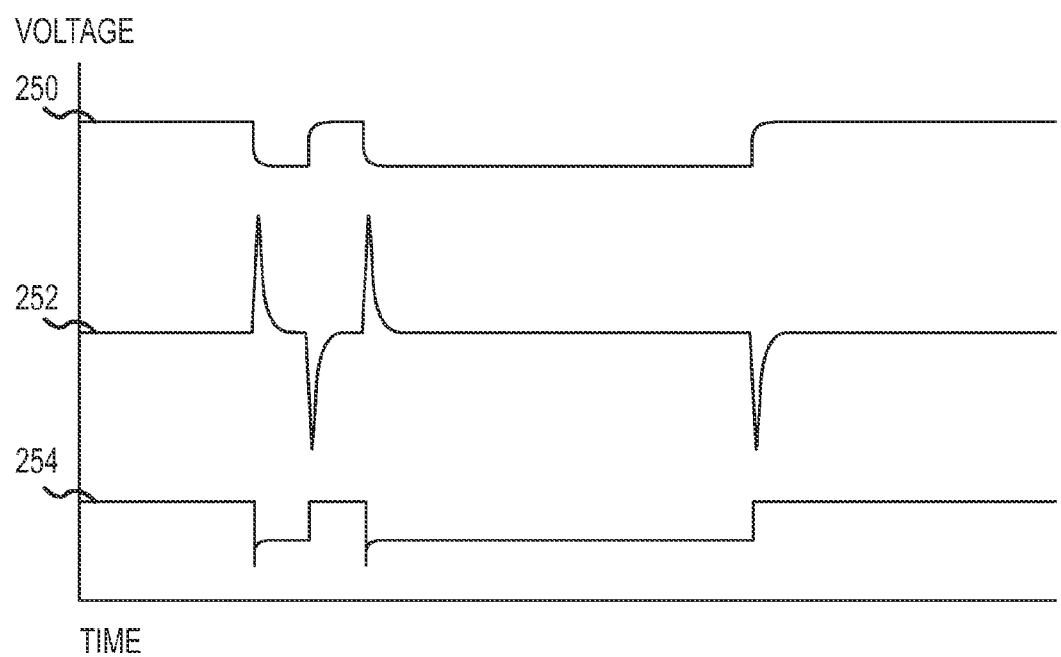
FIG. 8 is a graph illustrating an illustrative input data signal transmitted from the input device, an illustrative amplified input signal as amplified by the receiving unit, and an illustrative output data signal as constructed by the computing device.

Once the receiving unit 152 receives the termination signal from the input device 104, the method 200 may proceed to operation 216. In operation 216, the receiving unit 152 may amplify the received signal and the receiving unit 152 and/or the processor 148 may recreate the originally transmitted input signal. FIG. 8 is an example illustration of the input data signal 250, as compared to the amplified input signal 252 and the digital output signal 254. With reference to FIG. 8, in some instances, the input signal 250 from the input device 104 may be a digital signal, but once it has been amplified by the receiving unit 152, it may become distorted with a poor SNR. This is because the receiving unit 152 may also function to amplify any high frequency noise (such as noise from the display screen 112, from a power source, etc.) that may be present in the system 100 in addition to the input signal 250.

Although the amplified input signal 252 may be distorted as compared to the original input signal 250, the digital signal may be reconstructed. In one embodiment, the receiving unit 152 may include the comparator 162, or the comparator 162 may otherwise be included as another portion of the computing device 102. The comparator 162 may analyze the amplified input signal 252 to determine the peaks and valleys, which may then be used to reconstruct and provide a digital output signal 250. For example, with reference to FIG. 8, the reconstructed input signal 254 may contain substantially the same digital data as the originally input signal 250. In the method 200, by first amplifying the original input signal 250 and then using a comparator (or other element) to digitize the amplified signal 252, variations between the input signal 250 and the output signal 254 due to phase change caused by changes in location of the input device 104 on the touch screen 106 may be reduced. The propagation delay in the input signal 250, which may be caused as the input device 104 moves across the touch screen 106. In these embodiments, by first high pass filtering the input signal, and then using a comparator, the rise and fall time of the response signal 254 from the input signal 250 may be increased, as compared to low pass or band pass filtering methods. The increases in rise and fall time may translate into less delay and thus fewer changes in phase.

After or substantially simultaneously with operation 216, the method 200 may proceed to operation 218. In operation 218 the touch screen 106 may switch from the stylus mode to the touch sensing mode. For example, the multiplexer 153 may switch between the receiving unit 152 and the sense circuitry and the drive controller 152 may be activated to provide a drive signal to the drive lines 140.

It should be noted that in some embodiments, to provide increased robustness against noise form the system, digital communication techniques, such as forward error correction (FEC), cyclic redundancy check (CRC), or parity bit check, may be used to provide error detection and/or correction. Other digital communication techniques also may be used. Furthermore, in some embodiments, the noise or interference of the system 100 may be deterministic and controlled by the computing device 102, such as noise caused by the stimulation signal applied to the drive lines 140. In these embodiments, receiving the input data from the input device 104 may be interleaved with the noise or interference source, or may otherwise be scheduled to reduce the noise or interference which may be able to reduce the effect of the noise or interference on the input data.

Figure 6:
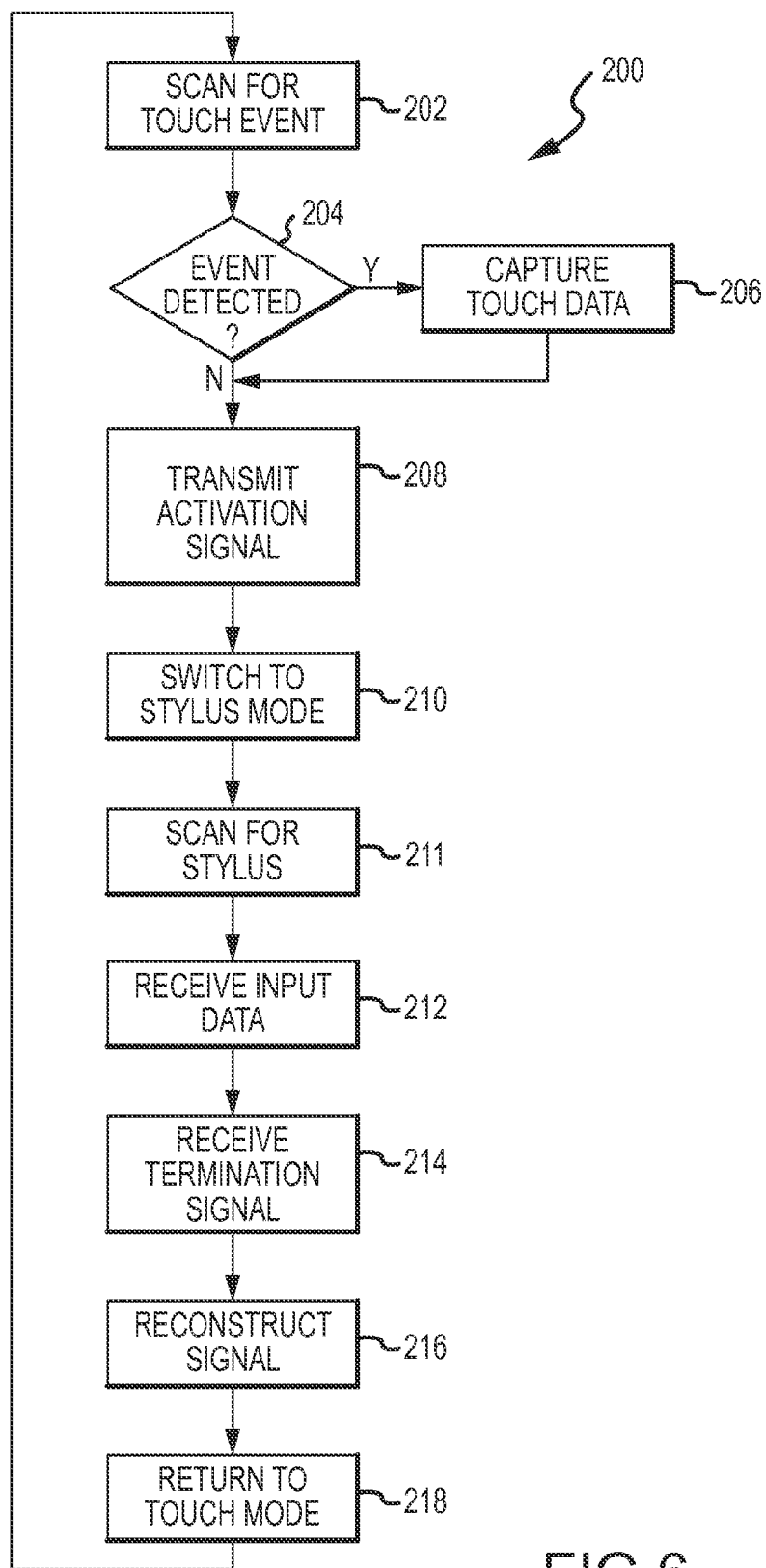
FIG. 6 is a flow chart illustrating a method for receiving digital data through a touch interface on the computing device from the input device.

Also, although the method 200 in FIG. 6 lists operations as being in a particular order, in many instances, the operations may be performed in arrangements other than as illustrated. Further, the method 200 provides an example for receiving touch events by touch scanning, scanning the touch screen to determine the location of the input device 104, and/or receiving digital data from the input device 104. Each of these different examples may be done in any order. As one example, the touch screen may first scan for the input device and its location prior to scanning for any touch events.

Also, it should be noted that the digital data transmission operation 212 may also include an operation of transmitting digital data from the touch screen to the input device 104. In other words, the digital data transmission between the input device and the touch screen may be bidirectional or unidirectional. Accordingly, although a separate operation is not illustrated, in some embodiments, the touch screen may not only receive data from the input device, but as discussed in more detail below, may also act to transmit data to the input device. In embodiments where the data transmission is bidirectional, the transmission may be half duplex or full duplex.

Input Data Transmission

In some embodiments, the input device 104 may transfer digital data to the touch screen 106 through the sensing circuit 150. In these instances, the receiving unit 152 may be omitted. For example, input data from the input device 104 may be an analog signal encoded with digital data, such as a waveform voltage signal. The data may be sent from the tip 122 to the electrode layer 116 of the touch screen 106. For example, the tip 122 may transfer a voltage waveform such as a sine wave, which may include digital data embedded in changes within the amplitude, frequency, phase, e.g., amplitude modulation, frequency modulation, or phase modulation. With reference to FIGS. 4 and 6, in one embodiment, the input device 104 may send an input signal including data within the amplitude and the frequency or phase. For example, the touch screen 106 may determine the location of the input device 104 based on the node 144 having the highest amplitude (assuming that the amplitude of the signal may decrease as it is transmitted away from the tip 122), and then other data, such as the sensor 126 data may be encoded within the phase or frequency of the input signal. In this way, the input device 104 may transmit input data, including its location and other sensor 126 data, to the computing device 102 through the electrode layer 116.

Figure 9A:
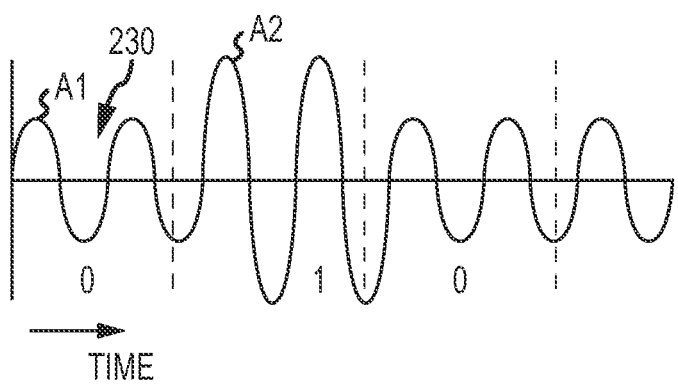
FIG. 9A is a diagram of a sample sinusoidal waveform encoded by amplitude modulation to include digital data.

For amplitude modulation, the digital data may be represented by two different amplitudes of the carrier wave. FIG. 9A is a diagram of a sample sinusoidal waveform encoded by amplitude modulation to include digital data. As shown in the sine wave 230 in FIG. 9A, over a predetermined time, the amplitude may vary between a first amplitude A1 and a second amplitude A2. The amplitudes A1 and A2 may be positive or negative, and may represent digital data, e.g., binary 0's and 1's. For example, the smaller amplitude A1 may represent 0's, such that for a predetermined time period or number or cycles the an amplitude having a height of A1 may represent a digital 0. Similarly, the larger amplitude A2 may represent 1's, such that a wave having an amplitude A2 for a predetermined time period or number of cycles may represent a digital 1.

Figure 9B:
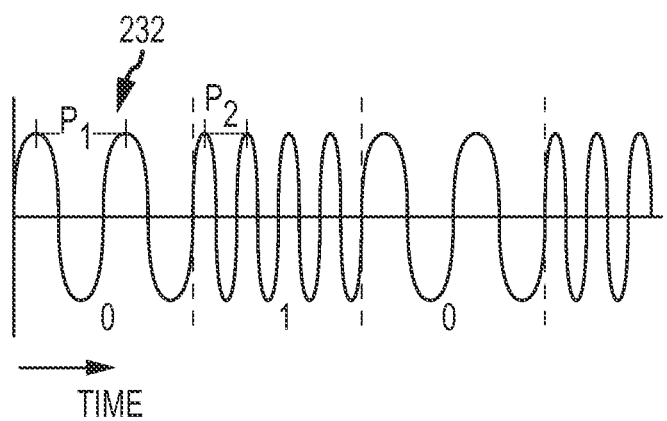
FIG. 9B is a diagram of a sample sinusoidal waveform encoded by frequency modulation.

As another example, the input data from the input device 104 may be encoded by frequency modulation. FIG. 9B is a diagram of a sample sinusoidal waveform encoded by frequency modulation. In this instance, digital data may be represented by two different frequencies of the carrier wave. For example, a first portion of the sine wave 232 may have a period P1 and a second portion may have a period P2, such that during a first time period, the sine wave 232 may have a first frequency of 1/P1 and during a second time period the sine wave 232 may have a second frequency of 1/P2. In this instance, the first frequency may represent a digital 0 and the second frequency may represent a digital 1.

Figure 9C:
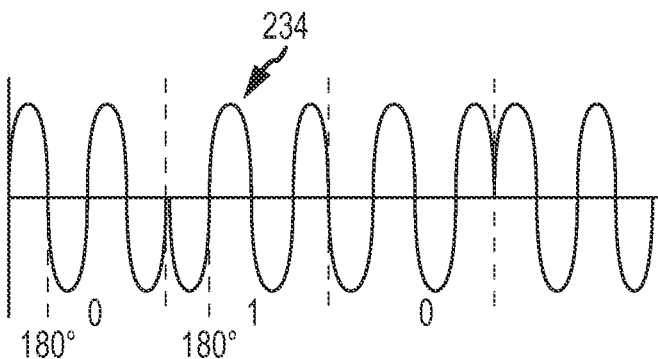
FIG. 9C is a diagram of a sample sinusoidal waveform encoded with data by phase shifting.

As yet another example, the input data from the input device 104 may be encoded by phase shifting. FIG. 9C is a diagram of a sample sinusoidal waveform encoded with data by phase shifting. With reference to FIG. 9C, using phase shifting, the digital data may be represented by different phases or phase shifts of the carrier wave. For example, a sine wave 234 may, during a predetermined time period, have a first portion with a first phase, and a second portion with a second phase that is shifted (e.g., either 90° or 180°) from the first phase. In this manner, the portion of the sine wave 234 having the first phase may represent a digital 0 and the second portion of the sine wave 234 shifted from the first portion may represent a digital 1.

Furthermore, it should be noted that in some embodiments, the input data from the input device 104 may include two forms of digital data encoding, e.g., the amplitude may be used to carry a first set of data and a phase of the carrier wave may be altered to carry a second set of data. With reference to FIGS. 9A and 9C, the amplitudes A1 and A2 may be varied along with the phases, so that for a single waveform, the amplitude height may represent a first set of data and the phase may represent a second set of data. For example, in FIG. 9A, the amplitudes may vary as shown and the phase of the sine wave 230 may also be varied.

Alternative Implementations

Figure 10:
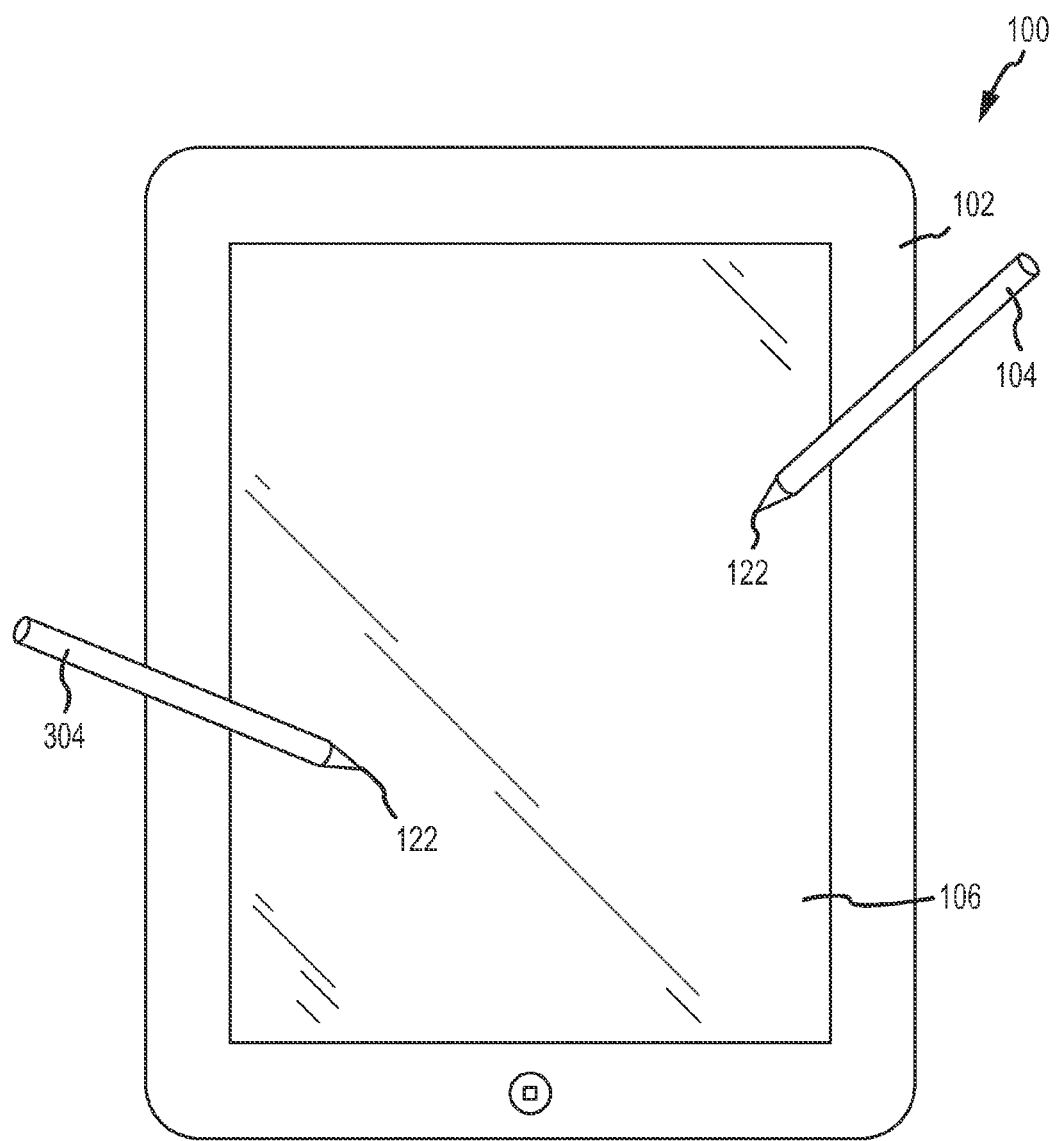
FIG. 10 is a perspective view of the system of FIG. 1 including a second input device.

In some embodiments, the system 100 may include a second input device 304. The second input device 304 may be substantially similar to the input device 104. FIG. 10 is a perspective view of the system 100 of FIG. 1 including two input devices 104, 304 configured to transmit and/or receive information from the computing device 102 through the touch screen 106. In these embodiments, the first input device 104 may be used by a first user to provide input the computing device 102, and the second input device 304 may be used substantially simultaneously with the first input device 104 by a second user or the same user. In this manner, two separate users may provide input to the computing device 102 through their own input devices 104, 304, or a user may use two or more input devices 104, 304 to provide input to the computing device 102. For example, using a drawing application or program, the first input device 104 may represent a first color that may be displayed on the screen or a first width brush and the second input device 304 may represent a second color and/or a second width brush. Alternatively, each of the input devices 104, 304 may be selectively modified by changing an input to the one or more sensors 126 (e.g., by a user varying the applied force, tilt, or the like of the respective device).

Figure 11:
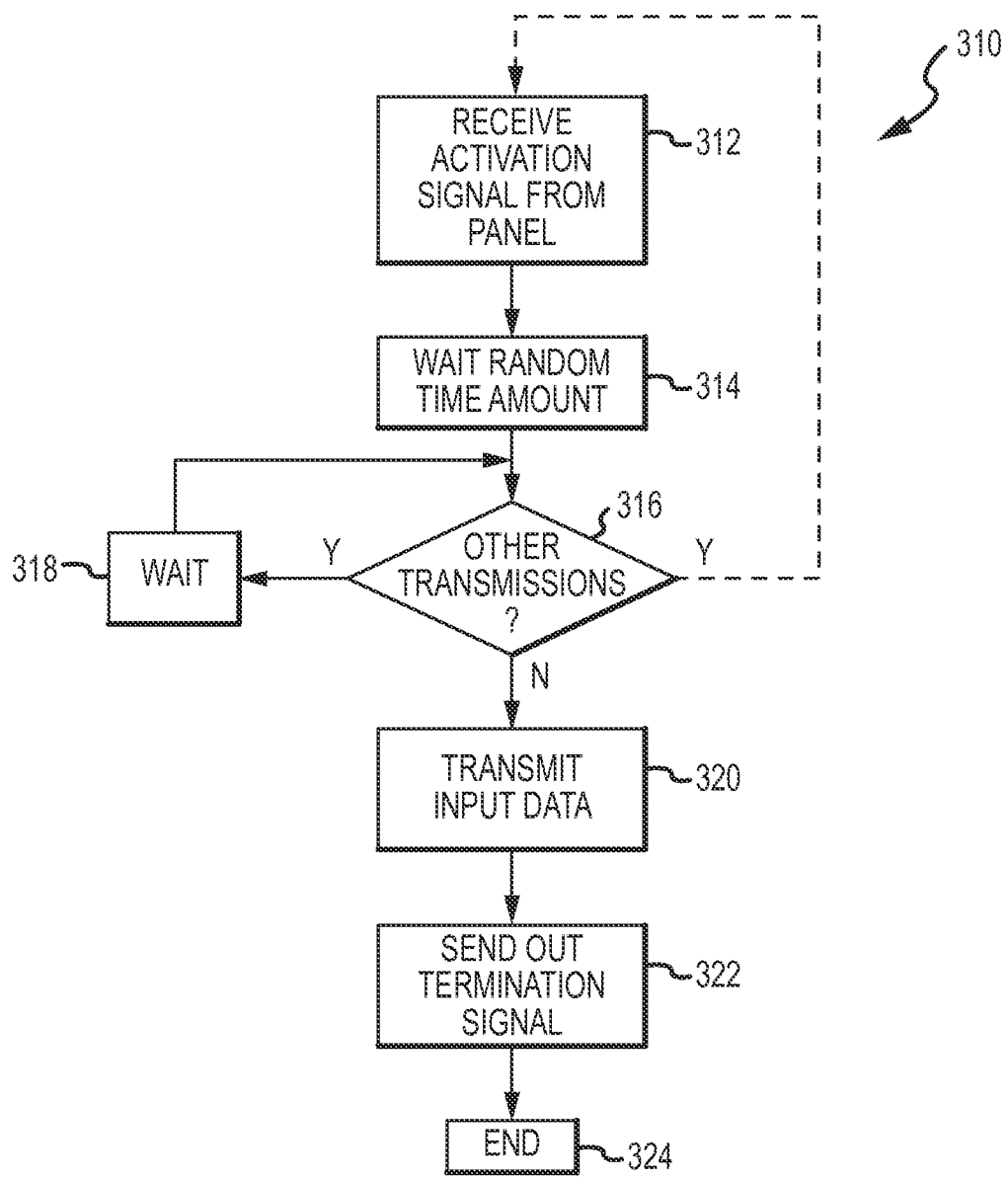
FIG. 11 is a flow chart illustrating a method for transmitting data from two input devices to the computing device.

A method for using two or more input devices 104, 304 to provide input to the computing device 102 may be substantially the same as illustrated in FIG. 6. However, the two input devices 104, 304 may be modified to help ensure informational clarity during transmission. FIG. 11 is a flow chart illustrating a method 310 for enabling each of the input devices 104, 304 to transmit data to the computing device 102 without interfering with a transmission from the other input device 104, 304. The method 310 may begin with operation 312 and the input devices 104, 304 may receive the activation or stimulation signal from the touch screen 106. In other words, in operation 208 in the method 200 of FIG. 6, the touch screen 106 may apply the activation signal to the touch screen 106, and specifically to the drive lines 140. The two input devices 104, 304 may receive the activation signal from the touch screen 106 as each of the input devices 104, 304 may be communicatively coupled to one or more drive lines 140 of the touch screen 106.

Once the input devices 104, 304 receive the activation signal, the method 310 may proceed to operation 314 and each of the input devices 104, 304 may wait before transmitting input data. In some embodiments, each input device 104, 304 may wait a random amount of time, such that the first input device 104 may wait 0.5 ms and the second input device 304 may be wait 1 ms. In other embodiments, the two input devices 104, 304 may wait a predetermined time, as long the time period for each input device 104, 304 is different from the other input device 104, 304.

After the input devices 104, 304 each wait, the method 310 may proceed to operation 316 and the input devices 104, 304 may each listen to determine if the other input device 104, 304 is transmitting to the touch screen 106. For example, the input devices 104, 304 may each detect signals transmitted by the first input device through the touch sense capacitive coupling networked formed of the sense and drive lines.

If a respective one of the input devices 104, 304 hears the other input device 104, 304 transmitting data to the touch screen 106, the method 310 may proceed to operation 318 and the input device 104, 304 may wait another time period. In this instance, the time period may be predetermined (e.g., it may correspond to an estimate d data transmission time) or may be random. After the input device 140, 30 waits, the method 310 may return to operation 316.

In some embodiments, if a respective one of the input devices 104, 304 hears the other input device 104, 304 transmitting data to the touch screen 106, the method 310 may proceed back to operation 312. In other words, rather than waiting, the other, non-transmitting input device 104, 304 may give up transmitting and wait to receive the next activation signal from the touch screen.

In operation 316, if the input device 104, 304 does not hear the other input device 104, 304 transmitting, the method 310 may proceed to operation 320. In operation 320, the input device 104, 304 may then transmit input data to the touch screen 106. For example, the input device 104, 304 may provide a digital signal to the drive lines 140 and/or the sense lines 142 which may correspond to the data from the one or more sensors 126. After the respective input device 104, 304 has transmitted input data to the touch screen 106, the method 310 may proceed to operation 322 and the input device 104, 304 may transmit a termination signal to the touch screen 106. The termination signal may have a larger amplitude than the data signal in order to indicate to the touch screen 106 that the particular input device 104, 304 is done transmitting data. After operation 322, the method 310 may proceed to an end state 324.

With the method 310 of FIG. 11, each input device 104, 304 may listen prior to transmitting data to ensure that the touch screen 106 may be configured to receive the input data, as well as may prevent confusion between the signals from each input device 104, 304. After a first round of transmission, the two input devices 104, 304 may be configured to wait the originally determined time in operation 314 prior to transmitting. That is, a random wait time of each input device 104, 304 in operation 314 may become the predetermined wait time prior to every transmission of the input device 104, 304. In other embodiments, each input device 104, 304 may wait a random time amount before every transmission.

In other embodiments, the receiving unit 152 may be included within the input device 104. With reference again to FIGS. 2 and 4, this may allow the computing device 102 to transmit data to the input device 104 through the touch screen 106 or other touch interface. In these instances, the touch screen 106 may transmit one or more data signals to the input device 104 through the electrode layer 116. For example, the drive controller 146, in addition to providing a stimulation or excitation signal to the drive lines 140, may also provide a digital signal that may be transferred through the electrode layer 116 to the input device 104. The tip 122 of the input device 104 may be communicatively coupled to the touch screen 106 and may transfer the received data signal to the receiving unit 152, which may be in communication and/or included within the input device 104. For example, the I/O interface 132 may include or be in communication with the receiving unit 152.

In instances where the receiving unit 152 may be included within the input device 104, the input device 104 may need to distinguish the data signal of the touch screen 106 from the excitation or stimulation signal. For example, if the digital signal and the touch screen 106 excitation signal at interleaved with time, with the digital signal being transferred from the touch screen 106 to the input device 104 at a 2 MHz symbol rate, and if the excitation signal is at 500 k Hz with a 50% duty cycle, the input device 104 will need to distinguish between the two. This is necessary because at the particular values above, a 500 KHz 50% duty cycle square wave could appear to the input device 104 as groups of digital 1's and 0's arranged in groups of four. As the digital data signal from the touch screen 106 may be transferred at a high frequency than the excitation signal, a coding mechanism which may use fast transitions which may not be able to be produced by the excitation signal may be used to allow the input device 104 to distinguish between the excitation signal and the data signal. For example, the data signal may include a header such as "010101" may transferred at the example 2 MHz symbol rate, which would identify the start of the digital communication. In the example above, the 500 kHz signal could not transition as quickly, and could not replicate the header.

Conclusion

The foregoing description has broad application. For example, while examples disclosed herein may focus on input devices, it should be appreciated that the concepts disclosed herein may equally apply to substantially any other type of communication between electronic devices. Similarly, although the input device and receiving unit may be discussed with touch screens, the devices and techniques disclosed herein are equally applicable to other types of capacitive coupling systems. Accordingly, the discussion of any embodiment is meant only to be exemplary and is not intended to suggest that the scope of the disclosure, including the claims, is limited to these examples.

What is claimed is:

1. A computing device configured to communicate with a peripheral input device, the computing device comprising:
   a processor;
   a touch interface in communication with the processor and configured to detect an input signal corresponding to an object approaching or contacting a surface;
   a digital data receiver in communication with the processor and the touch interface and configured to receive through the touch interface at least one input signal transmitted from the peripheral input device, wherein the at least one input signal transmitted from the peripheral input device includes an excitation signal with a first amplitude and digital data with a second amplitude, wherein the second amplitude is smaller than the first amplitude; and
   a plurality of switches configured to couple, in response to receiving the excitation signal, the digital data receiver to a plurality of sense lines of the touch interface to receive the digital data during transmission periods of the peripheral input device, and decouple, in response to receiving a termination signal from the peripheral input device, the digital data receiver from the plurality of sense lines of the touch interface; wherein
   the digital data receiver amplifies the at least one input signal creating at least one amplified input signal; and
   one of the processor or the digital data receiver analyzes the at least one amplified input signal and creates at least one digital output signal corresponding to the at least one input signal.

2. The computing device of claim 1, wherein the digital data receiver includes a high pass filter amplifier.

3. The computing device of claim 2, wherein the digital data receiver further comprises a comparator coupled to the high pass filter amplifier, and the comparator generates the at least one digital output signal based on the at least one amplified input signal.

4. The computing device of claim 3, wherein the comparator is a Schmitt trigger.

5. The computing device of claim 1, wherein the computing device further comprises a display screen in communication with the processor and positioned to at least partially overlap with the touch interface.

6. The computing device of claim 1, wherein the touch interface further comprises
   a plurality of driving electrodes in communication drive lines, the plurality of drive lines configured to cross at least a portion of the plurality of sense lines;
   a transmission medium positioned between the plurality of drive lines and the plurality of sense lines; and
   a sensing circuit in communication with the plurality of sense lines and configured to detect a signal change on the plurality of sense lines.

7. The computing device of claim 1, wherein the at least one input signal includes digital data corresponding to at least one sensor within the peripheral input device.

8. The computing device of claim 7, wherein the at least one sensor is one of an accelerometer, a gyroscope, a force sensor, a pressure sensor, or a temperature sensor.

9. The computing device of claim 1, wherein one of the processor, a sensing circuit, or the digital data receiver can determine the location of the based on the excitation signal.

10. A method for transmitting digital data to a computing device through a touch interface comprising:
    receiving an activation signal transmitted from a peripheral input device to at least one electrode of the touch interface;
    receiving at a digital data receiver a digital input signal transmitted from the peripheral input device through at least one electrode of the touch interface;
    coupling, in response to receiving the activation signal, via a plurality of switches, a digital data receiver to a plurality of sense lines of the touch interface to receive the digital data during transmission periods of the peripheral input device;
    decoupling, via the plurality of switches, the digital data receiver from the plurality of sense lines of the touch interface in response to receiving a termination signal from the peripheral input device;
    amplifying at the digital data receiver the transmitted digital input signal; and
    generating a digital output signal based on the amplified digital input signal.

11. The method of claim 10, wherein generating the output digital signal comprises analyzing an amplified digital input signal to determine at least one peak and at least one valley.

12. The method of claim 10, wherein the peripheral input device is a stylus.

13. The method of claim 10, wherein the digital output signal is generated by a comparator or a converter.

14. The method of claim 10, wherein the digital data receiver includes a high pass filter that amplifies high-frequency components of the input signal.

15. The method of claim 10, wherein the touch interface is configured to detect changes in capacitance in order to detect an object approaching or touching a surface.

16. The method of claim 10, wherein the computing device is a smart phone.

17. The method of claim 10, the method further comprising:
    configuring the digital data receiver to receive the digital input signal in response to receiving the activation signal.

18. The method of claim 10, further comprising:
    in response to receiving the activation signal, entering a peripheral input device mode.

19. The method of claim 18, further comprising:
    generating the digital output signal based on the amplified input signal in response to receiving the termination signal.

20. The method of claim 19, further comprising:
    in response to receiving the termination signal, exiting the peripheral input device mode.

21. The method of claim 18, wherein the termination signal is embedded within the digital input signal.

22. The method of claim 10, wherein the activation signal and the digital input signal are received by a common electrode.

23. A non-transitory computer readable storage medium having stored thereon a set of instructions for transmitting digital data to a computing device through a touch interface that when executed by a processor causes the processor to:
    receive an activation signal transmitted from a peripheral input device to at least one electrode of the touch interface;
    receive at a digital data receiver a digital input signal transmitted from the peripheral input device through at least one electrode of the touch interface;
    couple, in response to receiving the activation signal, via a plurality of switches, a digital data receiver to a plurality of sense lines of the touch interface to receive the digital data during transmission periods of the peripheral input device;
decouple, via the plurality of switches, the digital data receiver from the plurality of sense lines of the touch interface in response to receiving a termination signal from the peripheral input device;
amplify at the digital data receiver the transmitted digital input signal; and
generate a digital output signal based on the amplified digital input signal.

* * * * *